United States Patent
Depoutovitch et al.

(10) Patent No.: US 11,843,663 B1
(45) Date of Patent: Dec. 12, 2023

(54) VECTOR-SCALAR LOGICAL CLOCK AND ASSOCIATED METHOD, APPARATUS AND SYSTEM

(71) Applicant: HUAWEI CLOUD COMPUTING TECHNOLOGIES CO., LTD., Gui Zhou Province (CN)

(72) Inventors: Alexandre Depoutovitch, Kanata (CA); Per-Ake Larson, Etobicoke (CA); Jack Hon Wai Ng, Kanata (CA); Chong Chen, Kanata (CA)

(73) Assignee: HUAWEI CLOUD COMPUTING TECHNOLOGIES CO., LTD., Gui Zhou Province (CN)

( * ) Notice: Subject to any disclaimer, the term of this patent is extended or adjusted under 35 U.S.C. 154(b) by 0 days.

(21) Appl. No.: 18/092,577

(22) Filed: Jan. 3, 2023

(51) Int. Cl.
| | |
|---|---|
| *H04L 67/1095* | (2022.01) |
| *G06F 1/12* | (2006.01) |
| *G06F 16/27* | (2019.01) |

(52) U.S. Cl.
CPC ............ *H04L 67/1095* (2013.01); *G06F 1/12* (2013.01); *G06F 16/27* (2019.01)

(58) Field of Classification Search
CPC ....... H04L 67/62; H04L 67/1095; H04L 9/40; H04L 69/28; G06F 9/485; G06F 2201/835; G06F 9/546
See application file for complete search history.

(56) References Cited

U.S. PATENT DOCUMENTS

| | | | | |
|---|---|---|---|---|
| 6,574,665 | B1* | 6/2003 | Khotimsky | G06F 9/546 709/224 |
| 8,356,007 | B2* | 1/2013 | Larson | G06F 16/1865 707/610 |
| 8,396,831 | B2* | 3/2013 | Larson | G06F 16/2322 707/638 |
| 8,825,848 | B1* | 9/2014 | Dotan | G06F 21/577 709/224 |
| 9,003,511 | B1* | 4/2015 | Yang | H04L 63/1441 726/13 |
| 2002/0062463 | A1* | 5/2002 | Hines | G06F 11/3612 714/E11.21 |
| 2003/0121027 | A1* | 6/2003 | Hines | G06F 11/362 719/321 |
| 2004/0003064 | A1* | 1/2004 | Astley | H04L 69/329 709/239 |

(Continued)

OTHER PUBLICATIONS

Lamport, Leslie., Time, clocks, and the ordering of events in a distributed system, Communications of the ACM vol. 21 No. 7, Jul. 1978.

(Continued)

*Primary Examiner* — Mahran Y Abu Roumi

(57) ABSTRACT

A logical clock is implemented in networked nodes. Messages between nodes can include either a scalar timestamp or a vector timestamp. The scalar timestamp leads to an overhead reduction, and nodes can select whether to send a scalar or vector timestamp depending on requirements. Message recipients update their logical clock vector differently depending on whether the scalar or vector timestamp is received. Applications to multi-master databases are also provided. The clock conforms to Lamport clock requirements when the scalar timestamp is sent, and conforms to both Lamport and vector clock requirements when the vector timestamp is sent.

21 Claims, 12 Drawing Sheets

(56) References Cited

U.S. PATENT DOCUMENTS

| | | | | |
|---|---|---|---|---|
| 2007/0282915 | A1* | 12/2007 | Vosshall | G06F 16/27 |
| 2010/0070470 | A1* | 3/2010 | Milencovici | G06F 16/273 |
| | | | | 707/610 |
| 2011/0145325 | A1* | 6/2011 | Hampel | G06F 9/54 |
| | | | | 709/227 |
| 2011/0145341 | A1* | 6/2011 | Hampel | H04L 67/131 |
| | | | | 709/208 |
| 2016/0285969 | A1* | 9/2016 | Moore | H04L 67/62 |
| 2017/0177518 | A1* | 6/2017 | Chew | G06F 11/3466 |
| 2019/0294205 | A1* | 9/2019 | Zhao | G06F 1/12 |
| 2019/0339734 | A1* | 11/2019 | Huang | G06F 1/14 |
| 2019/0384695 | A1* | 12/2019 | Allen | G06F 11/366 |
| 2020/0059376 | A1* | 2/2020 | Slovetskiy | H04L 12/1877 |
| 2021/0018953 | A1* | 1/2021 | Ford | G06F 1/10 |

OTHER PUBLICATIONS

Mattern, Friedemann., Virtual time and global states of distributed systems, University of Kaiserslautern, Department of Computer Science, Oct. 3, 1988.

* cited by examiner

600

602 At Node $j$: Receive message $m$ having: scalar timestamp $TS^S(m)$ or vector timestamp $[TS^V(m)[1], TS^V(m)[2], ..., TS^V(m)[N]]$

604 For vector timestamp: Update logical clock vector: $[CK_j[1], CK_j[2], ..., CK_j[N]]$ According to update rule satisfying:

$CK_j[k] \leftarrow \max(TS^V(m)[k], CK_j[k]), \forall k \neq j;$ $CK_j[j] \leftarrow \max\left(\max_k(TS^V(m)[k]), CK_j[j]\right) + r, \; r > 0.$

606 For scalar timestamp: Update logical clock vector: $[CK_j[1], CK_j[2], ..., CK_j[N]]$ According to update rule satisfying:

$CK_j[j] \leftarrow \max(TS^S(m), CK_j[j]) + r, \; r > 0.$

FIG. 6

LFB can be applied to Master A's buffer pool when $(TS_1, PS_1, TS_3, TS_3) \le (C_1, C_2, C_3, C_4)$

VECTOR-SCALAR LOGICAL CLOCK AND ASSOCIATED METHOD, APPARATUS AND SYSTEM

CROSS-REFERENCE TO RELATED APPLICATIONS

This is the first application filed for the present invention.

FIELD OF THE INVENTION

The present invention pertains to the field of logical clocks for tracking event ordering at multiple networked devices, and in particular to a logical clock operable as either a vector clock or a scalar clock, and associated methods, apparatus and system.

BACKGROUND

Performance capabilities of a single computer are limited and are often not enough to support large-scale applications. Because of this, various distributed applications became popular and widely adopted. Distributed applications run on multiple computers and many of them require establishing an order of events. One example of such a distributed application is a distributed database. A database requires establishing a global order of modifications to a same item (page, row, value) because the changes are often incremental, and because the database typically needs to track the latest value. Also, because pages of a database are connected into more complex data structures, such as B+ trees or others, contents of the data of the pages should be consistent. For example, if a parent page of a tree points to a leaf page of the tree, then the leaf page should point to the same parent. Also, in order to support transaction isolation, databases should be able to determine if a given modification is visible to a given transaction, and this determination is made based on the order of events, such as transaction start time, modification time, commit time of a transaction making the modification, and others. For snapshot isolation and other features, a global snapshot of a system is required. A snapshot is a state of a system as it was or may be at some specific moment in physical time. Thus, ordering of events is also important for snapshot creation, to establish which events are to be part of a snapshot and which events are not.

Thus, logical clocks are a critical component of many distributed systems including databases. Speed and functionality of such systems depend to a great extent of effectiveness of the logical clocks implementation.

One way to establish global order of events is to request a timestamp of all events of interest from a centralized device. For example, Oracl™ RAC uses a centralized SCN (system change number) service in some Oracl™ RAC implementations. However, such a centralized approach results in significant bottlenecks, overhead penalties and scalability problems as the device issuing timestamps may be required to support a high rate of requests.

Lamport clocks, as proposed in Lamport, Leslie. "Time, clocks, and the ordering of events in a distributed system." Communications of the ACM Volume 21 Number 7, July 1978, provide a distributed approach for synchronizing a system of logical clocks spanning multiple computer devices, which can be used to totally order the events in a distributed system. The basic algorithm is as follows. Each node has single logical clock counter, incremented with every local event. When a message is sent, the message is stamped with the sender's clock counter. When the message is received, the receiver's clock is set to the maximum between the receiver's clock and the message timestamp.

Each message in a system implementing a Lamport clock scheme is increased by the size of the clock counter (typically 8 bytes). Also, a timestamp of an event is guaranteed to be higher compared to any event that the event may depend upon. However, based on the timestamps of two events alone, there can be no conclusion drawn regarding which event happened before the other. Another disadvantage of Lamport clocks is that a globally consistent snapshot of the system state cannot be created easily without a large performance penalty on the system. Nonetheless, Lamport clocks are used by IBM™ PureScale and some installations of Oracle™ RAC.

In order to address the above problems, vector clocks were proposed by Mattern F. "Virtual time and global states of distributed systems." Univ., Department of Computer Science, October 1988. The vector clock scheme is implemented as follows. Each node in a network maintains a vector of clock counters, one counter for each node. When a message is sent, the message is timestamped with the sender's entire clock vector. When a message is received, the receiver updates its vector clock choosing, for each element in the vector, the maximum between the corresponding local and remote values.

For vector clocks, snapshot creation can be done by an initiating node sending a snapshot request message with some future time for which the snapshot is to be created. Once every other node receives this request, it replies with an acknowledgement and takes the snapshot when its clock reaches the chosen point in time. Vector clocks are used by Amazon Dynamo.

However, it has been noted in academic papers that vector clocks can be potentially very large. This leads to a significant overhead penalty in large systems, because each message includes a vector timestamp with size proportional to the number of nodes in the system. This is true even when the message itself is brief, e.g. a command to lock or unlock a database record. Multiple solutions to this issue have been proposed. For example, Hybrid Vector clocks combining physical clocks and logical clocks in one counter were proposed that rely on local physical clocks for time intervals large enough compared to physical clock accuracy to determine the order of two events, and thus reduce size of logical clocks. Interval tree clocks have been proposed to allow the size of a vector clock or timestamp to grow dynamically with the system rather than reflect the largest possible number of nodes. Bloom filter clocks have been proposed to reduce size of vector clocks by using a probabilistic Bloom filter. However, such solutions are potentially complex, not always appropriate, and subject to improvement.

Therefore, there is a need for a logical clock implementation that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a vector-scalar (VS) logical clock and associated methods, apparatus and system. Embodiments of the present disclosure provide for a distributed logical clock implementation which readily allows for event ordering and creation of globally consistent snapshots, while limiting the overhead, such as memory or communication overhead, required for exchanging clock information between devices, compared with prior techniques.

According to embodiments of the present invention, there is provided an apparatus implementing a logical clock. The apparatus may be part of a network including multiple such apparatuses. The apparatus is configured to update the logical clock upon receipt of a message from another apparatus implementing another instance of the logical clock. The logical clock has multiple clock components, the components including a local clock component which represents a logical local time of the apparatus. If or when the message includes a vector time stamp having multiple values, the updating is performed so as to conform with both: a Lamport clock requirement with respect to the local clock component; and a vector clock requirement with respect to all of the clock components. If or when the message includes a scalar timestamp having a single value, the updating conforms with the Lamport clock requirement with respect to the local clock component, without necessarily conforming with said vector clock requirement.

In various embodiments, the vector timestamp may be denoted as a vector $TS^V(m)$ having each $k^{th}$ component $TS^V(m)[k]$. The scalar timestamp may be denoted as $TS^S(m)$. The logical clock $CK_j$ may be denoted as a vector having each $k^{th}$ component $CK_j[k]$, with component $CK_j[j]$ representing the local clock component. In some such embodiments, conforming with the Lamport clock requirement may include updating the logical clock according to an update rule satisfying:

$$CK_j[j] \leftarrow \max\left(\max_k(TS^V(m)[k]), CK_j[j]\right) + r, r > 0,$$

when a vector timestamp is received, and $CK_j[j] \leftarrow \max(TS^S(m), CK_j[j]) + r, r > 0,$ when a scalar timestamp is received.

Additionally or alternatively, conforming with the vector clock requirement may include updating the logical clock according to an update rule satisfying:

$CK_j[k] \leftarrow \max(TS^V(m)[k], CK_j[k]), \forall k \neq j.$

Additionally or alternatively, conforming with both the Lamport clock requirement and the vector clock requirement may include updating the logical clock according to an update rule satisfying:

$CK_j[k] \leftarrow \max(TS^V(m)[k], CK_j[k]), \forall k \neq j;$ $$CK_j[j] \leftarrow \max\left(\max_k(TS^V(m)[k]), CK_j[j]\right) + r, r > 0,$$

when a vector timestamp is received, and $CK_j[j] \leftarrow \max(TS^S(m), CK_j[j]) + r, r > 0,$ when a scalar timestamp is received.

In some embodiments, the updating conforming with both the Lamport clock requirement and the vector clock requirement includes the following. The local clock component is updated in conformity with the Lamport clock requirement, based on the vector timestamp and a current state of the logical clock. Further, all of the multiple clock components, other than the local clock component, are updated in conformity with the vector clock requirement, based on the vector timestamp and the current state of the logical clock.

In some embodiments, updating each one of the multiple clock components other than the local clock component includes either: adjusting that one of the multiple clock components upward according to an update rule; or maintaining that one of the multiple clock components at its prior value without adjustment, when said maintaining satisfies the update rule.

In some embodiments, the updating conforming with the Lamport clock requirement without necessarily conforming with said vector clock requirement includes the following. The local clock component is updated in conformity with the Lamport clock requirement, based on the vector timestamp and a current state of the logical clock. All of the multiple clock components other than the local clock component are not updated.

In some embodiments, the apparatus is further configured to process at least part of the message to determine whether the message includes the vector timestamp or the scalar timestamp.

In some embodiments, the apparatus is one of a plurality of master devices in a multi-master database. In some further embodiments, each master device is configured to send an associated message including a scalar timestamp when the associated message relates to a simple event ordering required at a recipient. Each master device is further configured to send another associated message including a vector timestamp when the other associated message relates to a globally consistent state required at the recipient, or when determining causality from timestamps is required, or both.

In some embodiments, when the message includes the scalar timestamp, the message also relates to a simple event ordering, when causality of events is known or unimportant, at the apparatus, and when the message includes the vector timestamp, the message also relates to a globally consistent state at the apparatus.

In some embodiments, the apparatus is further configured as follows. When the apparatus is to send a message to another apparatus implementing another logical clock, the apparatus selects either a scalar timestamp or a vector timestamp to include in the message to be sent. The apparatus then sends the message including the scalar timestamp or the vector timestamp. The scalar timestamp is set to a value of the local clock component following an incrementing thereof. The vector timestamp is set to a vector value having multiple components. One of the multiple components (e.g. having an index corresponding to an index of the apparatus) is set to a value of the local clock component following an incrementing thereof. Each other one of the multiple components is set to respective values equal to a different respective one of the multiple clock components other than the local clock component. All of the multiple clock components are represented in the other vector timestamp.

According to other embodiments of the present invention, there is provided a method for implementing a logical clock in a networked apparatus. The method includes updating the logical clock upon receipt of a message from another apparatus implementing another instance of the logical clock. The logical clock has multiple clock components including a local clock component representing a logical local time of the apparatus. If or when the message includes a vector time stamp having multiple values, the updating conforms with both: a Lamport clock requirement with respect to the local clock component; and a vector clock requirement with respect to all of the multiple clock components. If or when the message includes a scalar timestamp having a single value, the updating conforms with the Lamport clock requirement with respect to the local clock component, without necessarily conforming with said vector clock requirement.

Other aspects of the above method may be provided, similarly to those of the above-described apparatus.

According to other embodiments of the present invention, there is provided an apparatus implementing a logical clock. The apparatus may be part of a network including multiple such apparatuses. The apparatus is configured to maintain the logical clock, having multiple clock components. The clock components include a local clock component representing a logical local time of the apparatus. When the apparatus is to send a first message to another apparatus implementing another logical clock, the apparatus is configured as follows. The apparatus sends the first message, with the first message including a scalar timestamp set equal to a value of the local clock component when the first message is being sent, or when data in the first message was created, following an incrementing thereof. When the apparatus is to send a second message to the other apparatus or to a further apparatus implementing a further logical clock (the second message sent either prior to or following the first message), the apparatus is configured as follows. The apparatus sends the second message including a vector timestamp. The vector timestamp is set equal to a vector value having multiple components. One of the multiple components (e.g. having an index corresponding to an index of the apparatus) is set equal to a value of the local clock component when the second message is being sent, following an incrementing thereof. Each other one of the multiple components is set to respective values equal to a different respective one of the multiple clock components other than the local clock component when the second message is being sent. All of the multiple clock components are represented in the vector timestamp.

In some embodiments, the first message further relates to a simple event ordering, when causality of events is known or unimportant, at the other apparatus. The second message further relates to a globally consistent state at the other apparatus or the further apparatus being the recipient of the second message.

According to other embodiments of the present invention, there is provided a method for implementing a logical clock in an apparatus connected to a network. The method includes maintaining the logical clock, having multiple clock components including a local clock component representing a logical local time of the apparatus. The method further includes, when the apparatus is to send a first message to another apparatus implementing another logical clock: sending the first message including a scalar timestamp set equal to a value of the local clock component when the first message is being sent, or when data in the first message was created, following an incrementing thereof. The method further includes, when the apparatus is to send a second message to the other apparatus or to a further apparatus implementing a further logical clock (the second message sent either prior to or following the first message): sending the second message including a vector timestamp. The vector timestamp is set equal to a vector value having multiple components. One of the multiple components (e.g. having an index corresponding to an index of the apparatus) is set equal to a value of the local clock component when the second message is being sent, following an incrementing thereof, and each other one of the multiple components is set to a respective value at least equal to a different respective one of the multiple clock components other than the local clock component when the second message is being sent. All of the multiple clock components are represented in the vector timestamp.

Other aspects of the above method may be provided, similarly to those of the above-described apparatus.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 6 illustrates a method for updating a VS clock, in accordance with another embodiment of the present disclosure.

It will be noted that throughout the appended drawings, like features are identified by like reference numerals.

DETAILED DESCRIPTION

Figure 1:
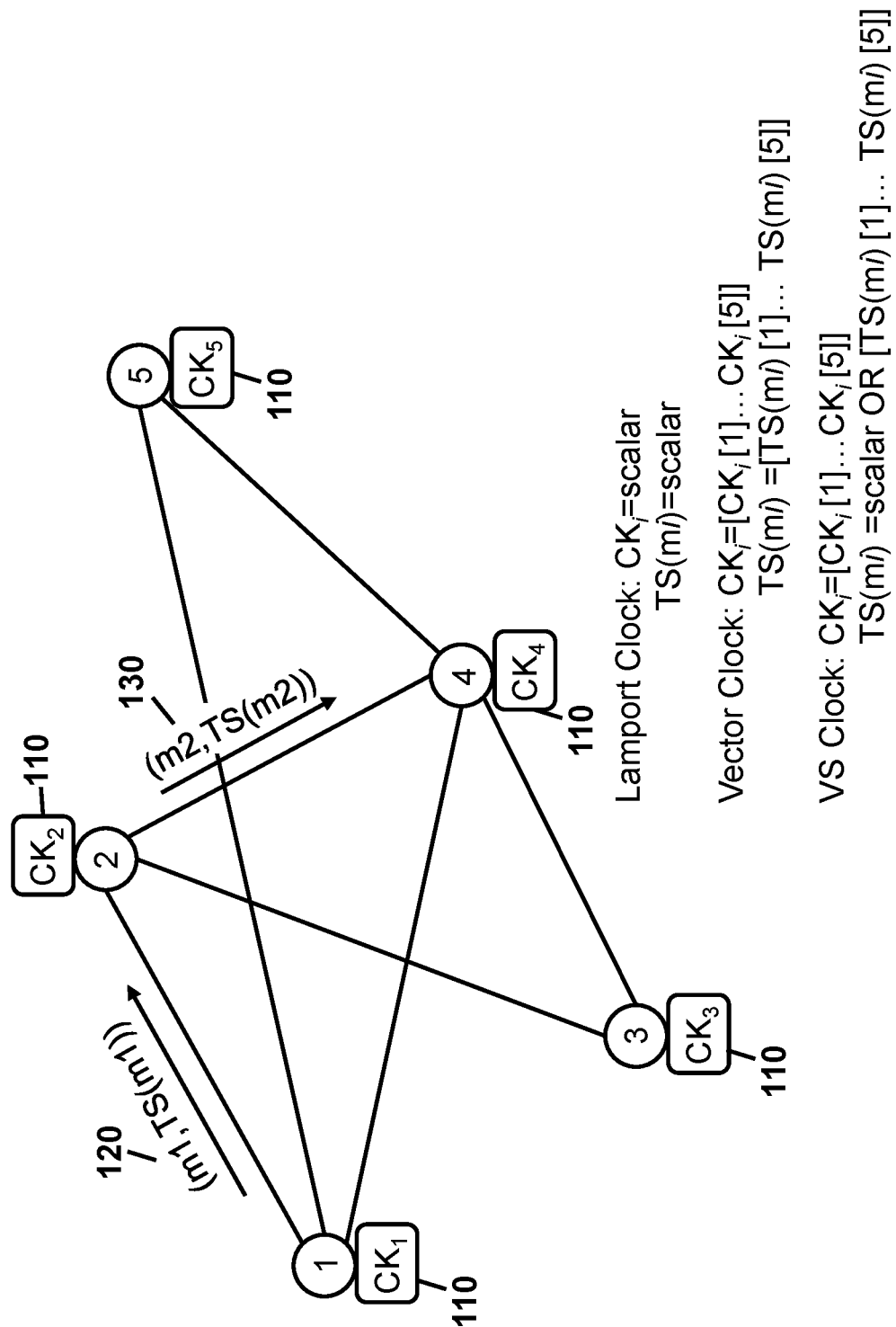
FIG. 1 illustrates a network of devices operating in accordance with an embodiment of the present disclosure.

Unless defined otherwise, all technical and scientific terms used herein have the same meaning as commonly understood by one of ordinary skill in the art to which this invention belongs. The numbers and numbers combined with letters correspond to the component labels in all the figures.

Embodiments of the present invention relate to a vector-scalar logical clock, also referred to as a VS clock, and associated methods, apparatus and system. The VS clock exhibits desirable attributes of both vector clocks and scalar (Lamport) logical clocks and supports two different modes of clock updating. In a vector mode, a message between devices (computers or other electronic or similar devices) includes a vector timestamp and a message recipient updates its clock in a manner which is consistent with both Lamport and vector clock requirements. In a scalar mode, a message between devices includes a scalar (single-value) timestamp and the message recipient updates this same clock in a manner which is consistent with Lamport clock requirements, but not (necessarily) consistent with vector clock requirements. When the functionality of a vector clock is not required, the scalar mode can be implemented, thus reducing messaging overhead. Otherwise, when the functionality of the vector clock is required, the vector mode can be implemented. Devices can switch between the two modes arbitrarily, for example on a message-by-message basis, according to current requirements.

In some embodiments, a node updates its clock using a first update rule when the message includes a scalar timestamp, and using a second, different update rule when the message includes a vector timestamp. However, in other embodiments, a single, unified update rule may be used regardless of whether a scalar timestamp or a vector timestamp is received. This unified update rule manifests differently depending on whether the timestamp is a scalar or a vector. For example, the update rule may include an operation to select a maximum value from a set of values, however if the set includes only a single value, then the operation degenerates into a rule which returns that single value (which is also by default the maximum). As another example, the update rule may include an operation to update clock components based on timestamp values other than a particular timestamp value conveying a value of a clock component as held be a sender. As explained elsewhere, this particular timestamp value may be the sender's local clock component in the case of a scalar timestamp, or the sender's clock component for the receiver in the case of a vector timestamp. However, when such timestamp values are not received, this operation is simply skipped as the required inputs do not appear. Generally, any of a variety of different implementations may be used to update a clock, all of which are substantially equivalent with respect to the resultant clock value.

A system according to embodiments includes a plurality of networked devices, also referred to as nodes or processes. Each node maintains a vector of clock counters, with one such clock counter instantiated for each node in the system, including the node maintaining the vector. When a first node sends a message to second node, the first node determines whether to include a vector timestamp or a scalar timestamp in the message, and incorporates the vector timestamp or the scalar timestamp accordingly. The second node, upon receipt of the message, then updates its own clock, with the result being generally different (except possibly in certain specific instances, for example for two nodes exchanging messages, the values of the clock components corresponding to other nodes are all the same.) depending on whether the timestamp incorporated in the message is a vector timestamp or a scalar timestamp.

FIG. 1 illustrates an example of a plurality of networked nodes, according to an embodiment. Five nodes, denoted 1, 2, 3, 4, 5 are networked together and can send messages to one another. Each node i also maintains its own clock $CK_i$ 110. When a node sends a message m, it also includes a timestamp TS(m), for example so as to send messages (m1, TS(m1)) 120 and (m2, TS(m2)) 130, this notation being used to denote a message along with its included timestamp.

Each node's local clock component is incremented by an amount (e.g. equal to at least 1) upon the node registering an event. As a general rule, such events may include sending a message and receiving a message. Other types of events may also trigger local clock component updates, although these are not considered here in detail. Events may correspond to a transition of a computer process on a physical device, from one state to another. The process may include, consist, or consist essentially of a sequence of such events. For certainty, node j's clock is denoted $CK_j$, and the local clock component of node j's clock is denoted $CK_j[j]$. When a node registers a (e.g. non-message) event, or when a node is to send a message, the node's local clock component may be incremented by a given (e.g. fixed or variable) amount, e.g. r=1, while the node's other clock components may remain the same. The timestamp TS(m) of the resulting message is typically set based on the value of the node's clock after this incrementing has occurred. Furthermore, when a node receives a message, this incrementing can be combined with the other clock update rules as specified elsewhere herein.

FIG. 1 further illustrates that, if the nodes were implementing a Lamport clock system, each timestamp TS(m) would be a scalar value. If the nodes were implementing a vector clock system, each timestamp TS(m) would be a vector value with five vector components denoted TS(m)[1] to TS(m)[5]. For the nodes implementing the VS clock, each timestamp may be either a scalar value or a vector value, depending for example on the action of the node sending the message. Such an action may depend in turn on the type of message being sent, and rules implemented at the sending node.

Figure 2:
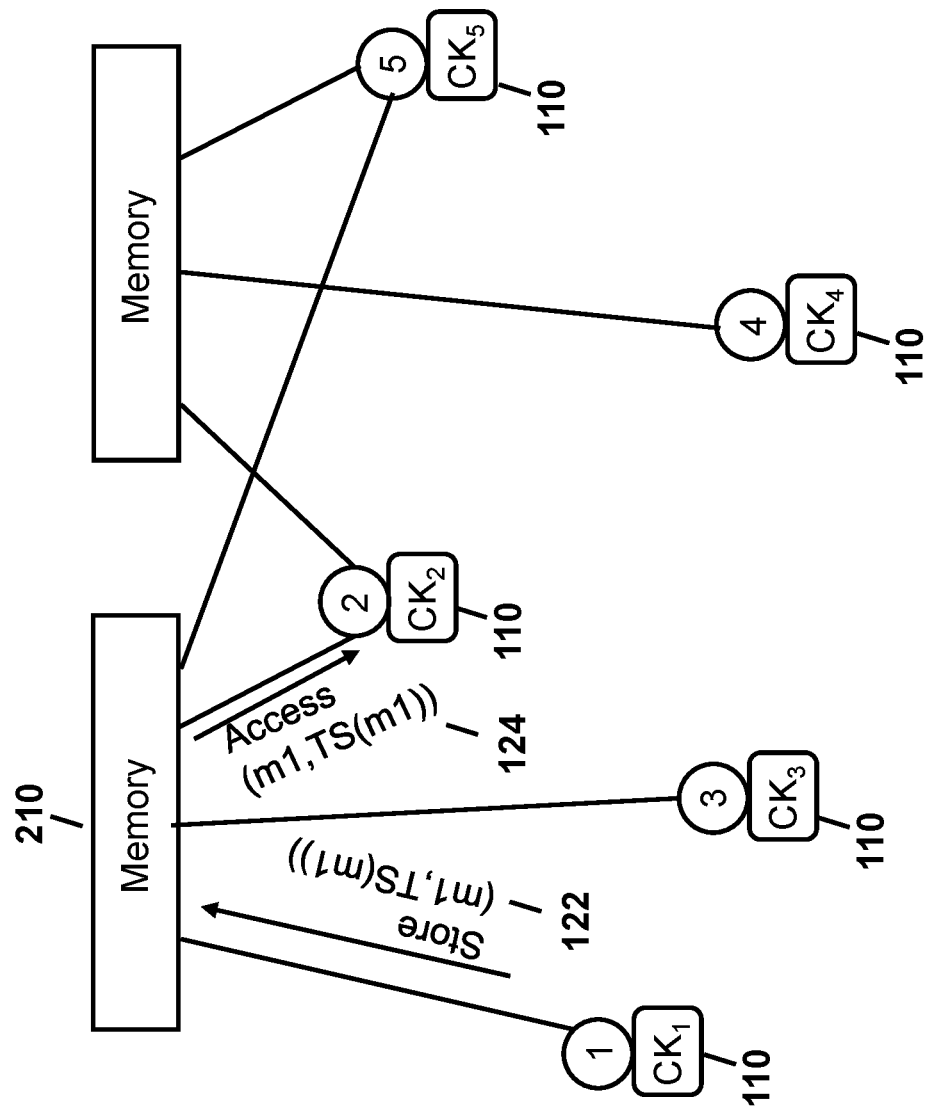
FIG. 2 illustrates a network of devices operating in accordance with an embodiment of the present disclosure, particularly with messages being passed via memory storage and memory access operations.

FIG. 2 illustrates a more particular network of nodes, which may be regarded as an example of the type of network of FIG. 1. The networks of FIGS. 1 and 2 are not topologically equivalent. In FIG. 2, nodes send messages to one another as in FIG. 1. However, the messages may be stored in one or more memories. Thus, node 1 may send 122 message m1 to a memory 210, where it is subsequently sent 124 to node 2 for example due to a memory access operation. The memory 210 can be considered part of the link or transmission path between two nodes. FIG. 2 is included to illustrate that, for example, messages and their associated timestamps may be sent across time by storage in memory. This becomes relevant in implementations such as multi-master databases. Thus, a message may be not only a network data sent directly from one node to another node through a network wire or other medium, but may also be data saved by one node on a persistent media (storage, memory) and later read by another node.

Figure 3:
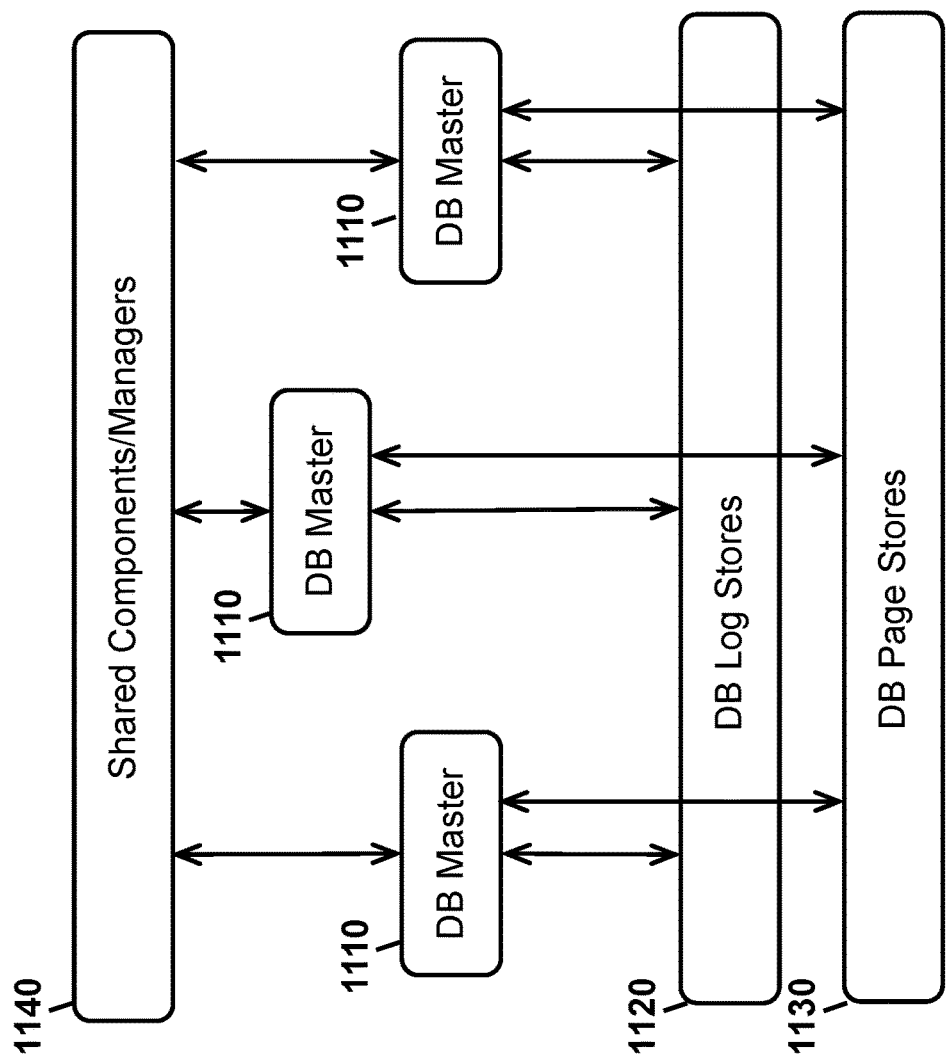
FIG. 3 illustrates a network of devices operating in accordance with an embodiment of the present disclosure, particularly configured as a multi-master database.

By way of example, FIG. 3 illustrates an example of a multi-master database system in which embodiments may be implemented. Each of a plurality of database masters 1110 acts as a node or device as described herein, including maintaining a VS clock and including in messages timestamps based on current state of the VS clock.

Database masters 1110 can read and write database logs stored in one or more database log stores 1120, and can read database pages stored in one or more database page stores 1130. The read and write interactions can be performed via a low-latency RDMA storage network, for example. Database masters 1110 can also interact with one or more (e.g. global) shared components or managers 1140 to lock pages, locate pages, etc. Database masters can also communicate with one another to share information, such as log record locations and page locations. Log records may be written and subsequently applied to update database pages.

The state of this system may be regarded as the data stored in the shared storage. This state consists of a set of pages. Each state change is an event and is represented as a change (log) record to a specific page. Each log record describes a change to a specific page.

Each database master 1110 is a node that can change the state of the system (e.g. change one or more pages). Changes may be made at a user's request, for example. Multiple changes to a specific page, by different database masters 1110, are synchronized by a separate concurrency control (CC) mechanisms. One example of CC is a pessimistic concurrency control (PCC) implemented by a Distributed lock service (DLS) (not shown), where before any change to a page, a database master 1110 acquires a lock through an explicit message. Another example of CC, is an optimistic CC (OCC), where database masters 1110 are free to attempt to change any page, but all simultaneous changes are required to go through a Conflict Detector (not shown) that checks for and rejects conflicting changes.

There are several types of messages. Examples of messages are messages to: write a log record, read a log record, read a page, lock a page, and unlock a page. Read/write messages can be communicated between two database masters 1110 or between a database master 1110 and a shared storage 1120, 1130. Lock/unlock message are between a database master 1110 and a DLS. Some or all of these messages may include scalar timestamps or vector timestamps.

Figure 4:
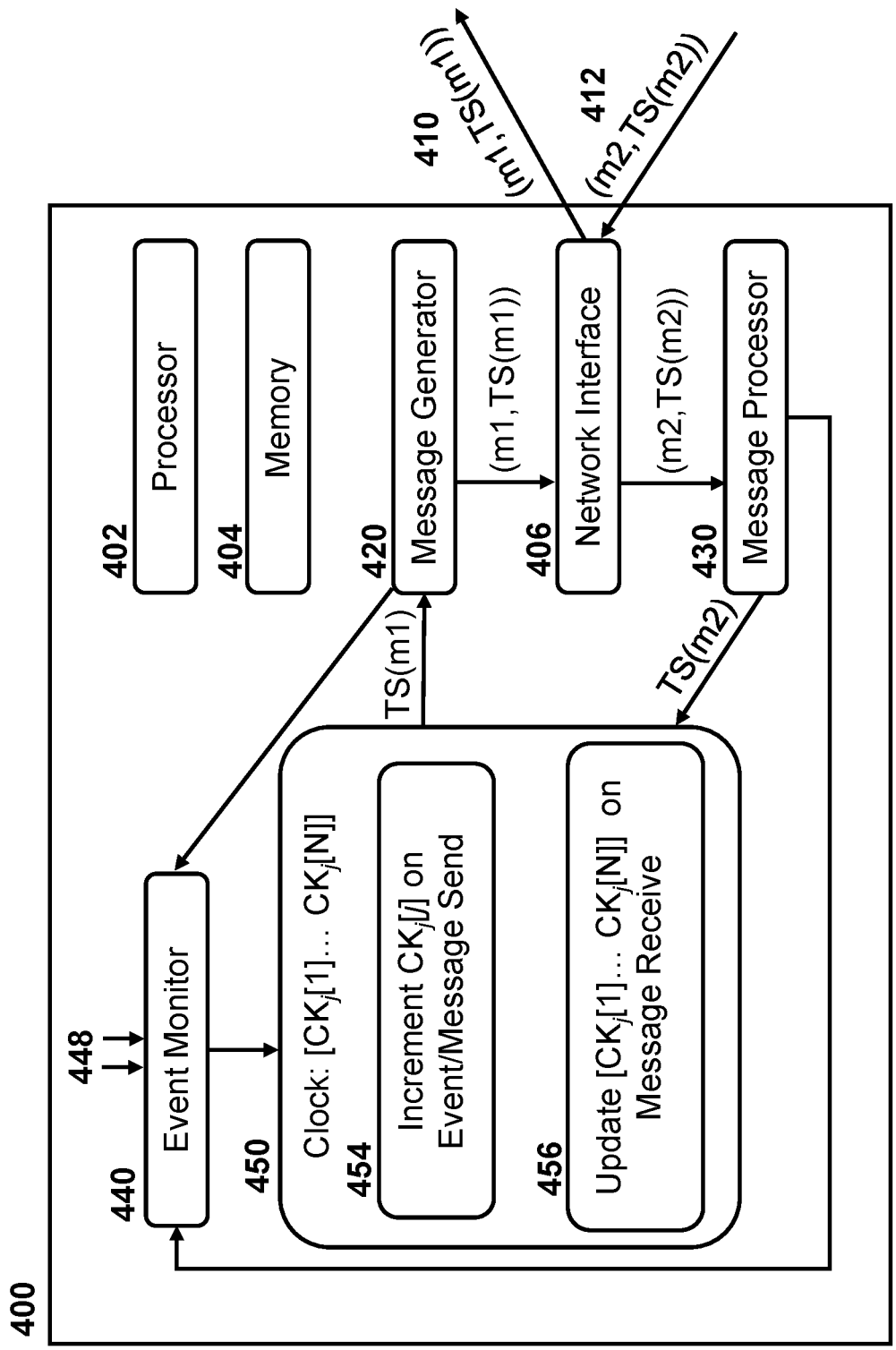
FIG. 4 illustrates a networked electronic device, such as a node or database master, according to an illustrative embodiment of the present disclosure.

FIG. 4 illustrates a networked electronic device 400 according to an illustrative embodiment of the present disclosure. It is noted that the particularities of FIG. 4 can be varied in several ways. The device includes a computer processor 402 operatively coupled to memory 404 and a network interface 406. The processor 402 may execute computer program instructions stored in memory 404 to provide for at least some of the below-described functional aspects of the device, such as the message generator 420, message processor 430, event monitor 440 and logical clock 450. Additionally, or alternatively, dedicated electronic hardware, for example digital or analog circuitry, or a combination thereof, may be used to implement such functional aspects. The network interface 406 sends and receives messages, such as sent message m1 410, along with its timestamp TS(m1), or received message m2 412 along with its timestamp TS(m2). The messages are sent and received via a predetermined network communication protocol via one or more wired, wireless or optical media.

When a message m1 410 is to be sent, the event monitor 440 registers this condition and updates the logical clock 450, if necessary, the updating involving incrementing 454. Generally speaking, the logical clock is updated prior to sending any message. However, in some embodiments, when the message is being sent in response to another event (e.g. a local event or receipt of a different message), such that the logical clock has just been updated in a similar manner, then the updating can be considered to already have been performed. Accordingly, in various embodiments, the timestamp which is included in a message may match the value of the logical clock at the time of the event (rather than the time of sending the message). In either case, the logical clock 450 is updated as follows: the local clock component is incremented 454 by a predetermined amount s (which may be set equal to 1, for example). This incrementing 454 can be expressed as:

$$CK_j[j] \leftarrow CK_j[j]+s, s>0 \quad (1)$$

Value s may be equal to one, for example. The notation "←" denotes that a value is updated (revised, replaced) based on its current value according to a given rule. If the type of timestamp to be included in the message m1 is a scalar timestamp, the clock 450 then provides the current value of its local clock component $CK_j[j]$ to the message generator 420 to be included as the entire timestamp TS(m1), also denoted $TS^S(m1)$ to emphasize that the timestamp is a scalar. If the type of timestamp to be included in the message m1 is a vector timestamp, the clock 450 instead provides the current value of its entire clock vector [$CK_j[1]$, $CK_j[2]$, . . . $CK_j[1\backslash1]$], where N is the size of the clock vector, to the message generator 420 to be included as the timestamp TS(m1), also denoted $TS^V(m1)$ to emphasize that the timestamp is a vector. The message generator 420 then sends the message m1 and the timestamp TS(m1) to the network interface 406 with instructions of where to send the message, etc. The message generator 420 may further determine whether the timestamp is to be a scalar timestamp or a vector timestamp, for example based on the type of message being sent.

When a message m2 412 is received at the network interface 406, the network interface sends the message m2 to the message processor 430. The message processor 430 processes the message m2 itself, for example to update an internal condition of the device, generate a response, etc. The message processor 430 further provides the timestamp TS(m2) included in the message m2 412 to the clock 450. The event monitor 440 registers that the message m2 412 has been received and initiates a clock update 456 accordingly. This clock update is different from the clock incrementing 454 as described above and can be described as follows. The message processor 430, or more generally the node upon receipt of a message, may process at least part of the message to determine whether the message includes a vector or scalar timestamp. The message processor may direct updating of the logical clock appropriately based on such a determination. Processing the message may involve determining a length of the message or a timestamp field thereof by examining the message contents, such as the field or a header indicating the field length, for example.

When the timestamp TS(m2) included with the message m2 412 is a scalar timestamp, it may be denoted $TS^S(m2)$ and the clock 450 is updated 456 according to an update rule which may be expressed as (with m set to m2):

$$CK_j[j] \leftarrow \max(TS^S(m), CK_j[j])+r, r>0 \quad (2)$$

Value r may be equal to one, for example.

When the timestamp TS(m2) included with the message m2 412 is a vector timestamp, it may be denoted $TS^V(m2)$ and the clock 450 is updated 456 according to an update rule which may be expressed as (with m set to m2):

$$CK_j[k] \leftarrow \max(TS^V(m)[k], CK_j[k]) \forall k \neq j; \quad (3)$$

$$CK_j[j] \leftarrow \max\left(\max_k(TS^V(m)[k]), CK_j[j]\right) + r, r > 0. \quad (4)$$

Thus, when a message is received, the receiving node/updates its own logical clock in a different manner depending on type of timestamp included with the message. When the timestamp is a vector timestamp, the node updates its local clock component $CK_j[j]$ as in (4) to a value which it is greater than all of: the immediately prior value of this local clock component, and all elements in the message timestamp. The node updates other components of its clock, i.e. $CK_j[k]$ for all $k \neq j$, as in (3) to a value which is equal to: the immediately prior value of this clock component and the corresponding component $TS^V(m)[k]$ of the timestamp included with the message. When the timestamp is a scalar timestamp, the node only updates its local clock component $CK_j[j]$, as in (2) to a value which is greater than: the immediately prior value of this local clock component, and the timestamp $TS^S(m)$ included with the message.

It is noted that Equation (2) causes the logical clock to update in conformity with the Lamport clock requirement, with respect to the local clock component $CK_j[j]$ of the logical clock's vector $CK_j$ in the scalar timestamp case. This can be verified by observing that the Lamport clock requirement includes that a node updates its local clock component i.e. $CK_j[j]$, on receipt of a message, so that this local clock component's value is greater than both: the immediately prior value of node j's local clock component $CK_j[j]$ and the local clock component's value $CK_j[i]$ of the node i which sent the message, at the time of sending. This other local clock component's value $CK_j[i]$ was equal to the received timestamp value, i.e. the scalar timestamp $TS^S(m)$, at the time this timestamp was created.

It is also noted that Equations (3) and (4) cause the logical clock to update in conformity with the Lamport clock requirement, with respect to the local clock component $CK_j[j]$ of the logical clock's vector $CK_j$, and also to update in conformity with the vector clock requirement. Conformity with the Lamport clock requirement can be verified by again recalling that the Lamport clock requirement includes that a node updates its local clock component i.e. $CK_j[j]$, on receipt of a message, so that this local clock component's value is greater than both: the immediately prior value of node j's local clock component $CK_j[j]$ and the local clock component's value $CK_j[i]$ of the node i which sent the message, at the time of sending. In this case, via Equation (4), because the updated local clock component is greater than all of the received timestamp values (via the inner maximization), it is necessarily greater than the local clock component's value $CK_j[i]$ of node i, since that local clock component's value is represented in the timestamp. Thus, the Lamport clock requirement is satisfied. In other words, according to various embodiments, conforming with the Lamport clock requirement includes updating the logical clock according to an update rule as expressed in Equation (4). This can be said to be true both when a vector timestamp is received, as well as when a scalar timestamp is received (as explained in more detail below).

Conformity with the vector clock requirement can be verified as follows. The vector clock requirement can be described as requiring that, on receipt of a message m from node i at node j, each clock component $CK_j[k]$ of node j is equal to the larger of: the immediately prior value of $CK_j[k]$, and the value of the sending node's $CK_i[k]$ at the time the message is sent (as indicated in the message's timestamp). Further, and typically, node j's local clock component $CK_j[j]$ is increased upon receipt of a message, for example such that:

$$CK_j[j](\text{new}) > CK_j[j](\text{old}) \qquad (5),$$

where $CK_j[j](\text{old})$ and $CK_j[j](\text{new})$ refer to the clock values before and after updating, respectively.

Equation (4) guarantees this requirement is satisfied for $CK_j[j]$, because $$\max_k(TS^V(m)[k])$$

will be at least equal to $CK_i[j]$. Equation (3) guarantees this requirement is satisfied for other values of k even more directly, noting that $TS^V(m)[k] = CK_i[k]$ as required.

Put another way, conforming with the vector clock requirement can be achieved by updating the logical clock according to an update rule satisfying Equations (3) and (4), which also necessarily involves updating the logical clock according to an update rule satisfying Equations (3) and (5), because satisfying Equation (4) automatically implies satisfying Equation (5). In addition, and in view of the above discussion, conforming with both the Lamport clock requirement and the vector clock requirement can be performed by updating the logical clock according to an update rule satisfying Equations (3) and (4). This is because, as explained above, such an update rule will satisfy both requirements simultaneously.

More generally, when a vector timestamp is received, updating a logical clock in a manner which conforms with both Lamport and vector clock requirements can be achieved by updating the local clock component in conformity with the Lamport clock requirement, and also updating all of the multiple clock components, other than the local clock component, in conformity with the vector clock requirement. In each case the updates are based on the vector timestamp and the current state of the logical clock. When the scalar timestamp is received, the local clock component is still updated in a manner which conforms with the Lamport clock requirement. Therefore, the Lamport clock requirement is always satisfied, regardless of whether vector or scalar timestamps are received.

As used herein, "updating" can involve adjusting a clock value upward by a certain amount when required to satisfy an appropriate clock requirement. However, if the clock value does not have to be adjusted upward in order to satisfy such a requirement, it can be held at its prior value, but still be considered to be updated, at least because it has been checked that the prior value is the appropriate value and still satisfies the appropriate clock requirement. In other words, updating a clock component can involve adjusting the clock component clock components upward according to an update rule, or else maintaining said one of the multiple clock components at its prior value without adjustment, when such maintaining satisfies the update rule. Local clock components are typically adjusted upward upon message receipt, rather than held fixed.

When a scalar timestamp is received, updating a logical clock in a manner which conforms with the Lamport clock requirement (without necessarily conforming with the vector clock requirement) can involve updating the local clock component in conformity with the Lamport clock requirement (based on the vector timestamp and a current state of the logical clock) while also refraining from updating all of the other clock components. For example, a node's local clock component can be updated according to Equation (2), or equivalently according to Equation (4).

It is also noted that, when the scalar timestamp is sent, conformity with the vector clock requirement is not necessarily satisfied, at least because recipient node j is not in receipt of multiple values of sending node i's clock vector, and thus cannot perform necessary updating based on same to track non-local components of node j's clock vector. Conformity might be satisfied coincidentally in some system states, where node j's clock components already satisfy the vector clock requirement, however this is not guaranteed.

The event monitor 440 may monitor for events such as: a message is going to be sent; or a message has been received. The event monitor may additionally monitor for internal or other non-message-related events 448, such as an internal state change, an internal trigger, a local input, etc. The event monitor may increment 454 the local clock component upon detecting such internal or non-message related events 448. The event monitor may be integrated with the clock, the message generator, the message processor, or a combination thereof, for example. Providing information from one component to another may involve sending the information internally in a message, or writing the information to memory at a location readable by a recipient component, or the like.

Figure 5:
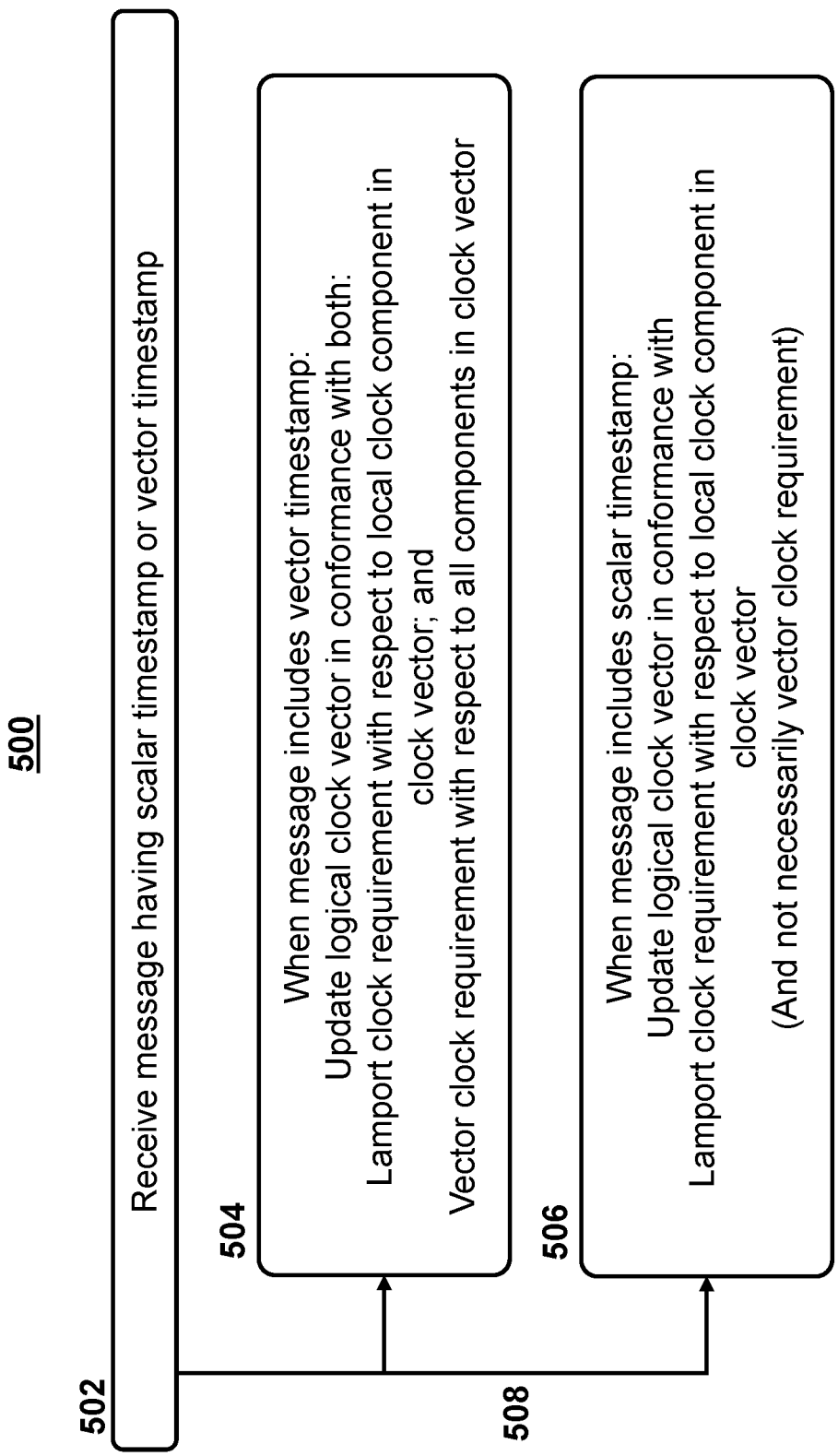
FIG. 5 illustrates a method for updating a VS clock, in accordance with an embodiment of the present disclosure.

FIG. 5 illustrates a method 500 provided according to embodiments of the present disclosure. The method may be carried out by the apparatus of FIG. 4, for example, labelled as node j. The method includes receiving 502 a message having a scalar timestamp or a vector timestamp. The method further includes, when 504 the message includes the vector timestamp, updating the logical clock vector in conformance with both a Lamport clock requirement with respect to the local clock component in the logical clock vector (e.g. $CK_j[j]$ for node j), and a vector clock requirement with respect to all components in the logical clock vector (e.g. $CK_j[k]$, k=1, 2, . . . , N). The method further includes, when 506 the message includes the scalar timestamp, updating the logical clock vector in conformance with the Lamport clock requirement, with respect to the local clock component in the logical clock vector. The logical clock vector is not necessarily updated with respect to the vector clock requirement. The method may further include determining 508, if necessary, whether the message includes the scalar timestamp or the vector timestamp.

FIG. 6 illustrates another method 600 provided according to embodiments of the present disclosure. The method 600 is similar to the method 500 of FIG. 5. As discussed above, operation 604 which implements the update rules satisfying Equations (3) and (4) can be regarded as satisfying the Lamport and vector clock requirements in the vector timestamp case, as well as satisfying the Lamport clock requirement in the scalar timestamp case. Therefore, operation 604 can in principle be applied when the timestamp is either a vector timestamp or a scalar timestamp. However, for greater certainty, operation 606 is added which shows the update rule applied when the timestamp is a scalar timestamp. Operation 602 corresponds with operation 502 and involves receiving a message m having either a scalar timestamp or a vector timestamp.

Figure 7:
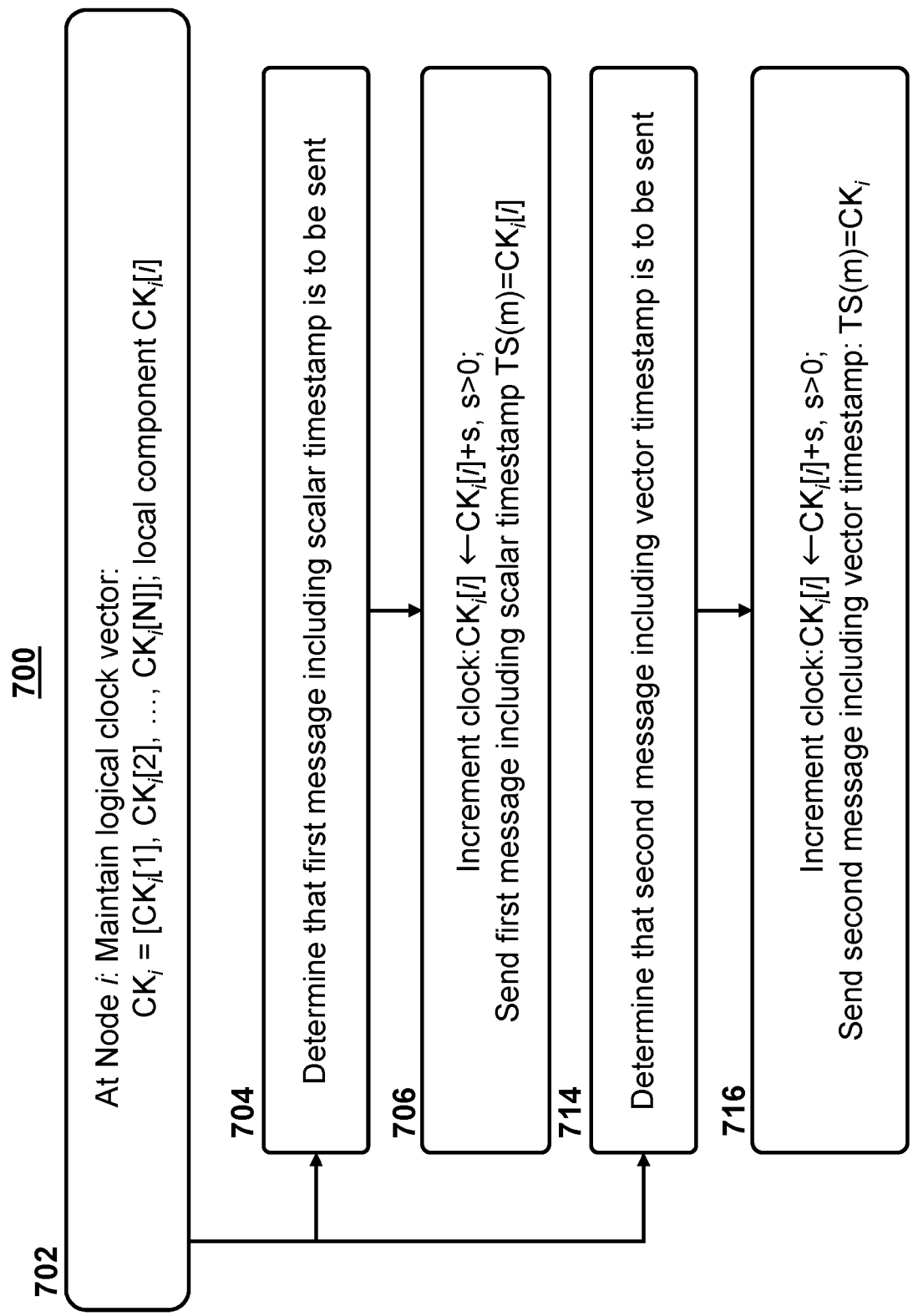
FIG. 7 illustrates a method for sending a message including a vector or scalar timestamp, in accordance with an embodiment of the present disclosure.

FIG. 7 illustrates another method 700 provided according to embodiments of the present disclosure, particularly for transmitting a message at a node i. In describing FIG. 7, the local clock component is incremented according to Equation (1) in steps 706 and 716. Then, also in steps 706 and 716, this incremented local clock is used in providing the timestamp values for inclusion in the message. The method includes maintaining 702 a logical clock vector having multiple vector components $CK_i[k]$, one for each node in the system. Component $CK_i[i]$ is denoted the local clock component. The method includes determining 704 that a first message including a scalar timestamp is to be sent. The determination may be made depending on a type or content of the first message. The method includes sending 706 the first message including the scalar timestamp $TS^S(m)$, which is set to a value of the local clock component after incrementing by s (from its value as it was prior to the determination 704). The method includes determining 714 that a second message including a vector timestamp is to be sent. The determination 714 may be made depending on a type or content of the second message. The method includes sending 716 the second message including the vector timestamp $TS^V(m)$, which has a vector component $TS^V(m)[i]$ set to a value of the local clock component after incrementing by s (from its value as it was prior to the determination 714). This incrementing may have been performed in response to an event which triggers the message creation. Other components $TS^V(m)[k]$ of the vector timestamp are set to values of corresponding clock components $CK_i[k]$. All N clock components are included in the vector timestamp, and therefore $TS^V(m)=CK_i$. Thus, a node sends two types of messages: messages with scalar timestamps and messages with vector timestamps. By sending messages with scalar timestamps at least some of the time, message overhead due to timestamping is reduced. The type of timestamp can be selected according to a variety of criteria, for example type of message.

Here and elsewhere, clocks are generally incremented in response to events (or the data generated in response to an event). Although sending a message may be considered an event, if the message itself is generated in response to an event, the clock is not necessarily incremented again when generating the message. Similarly, although receiving a message may be considered an event, the clock update rules described herein already operate to increment the clock, so a separate increment is not necessary. Furthermore, the timestamp of a message may be the timestamp of the data produced as consequence of the event that the message describes, rather than the timestamp of the "event" of sending the message.

Figure 8:
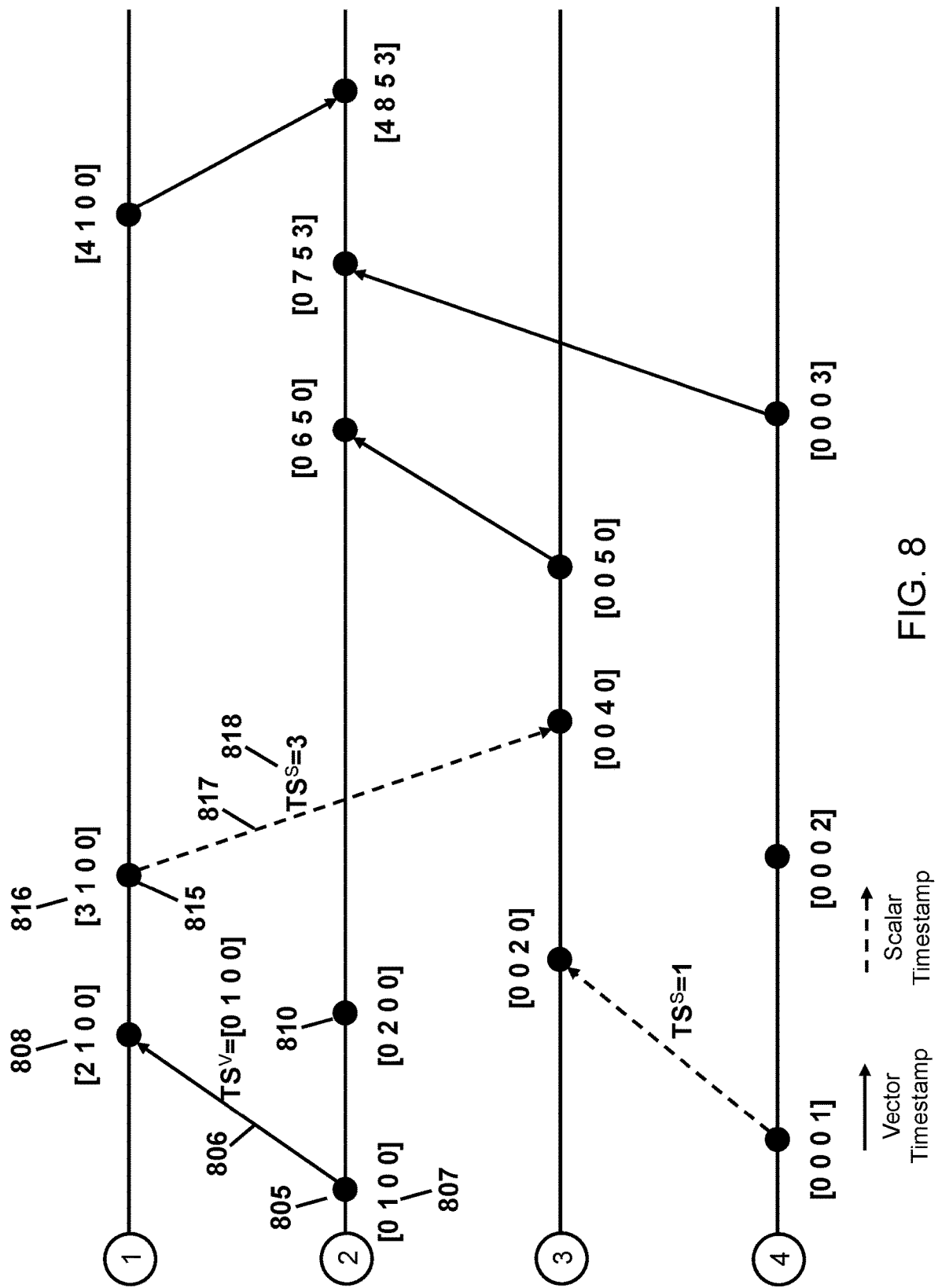
FIG. 8 illustrates an example of nodes sending messages and updating VS clocks, according to an embodiment of the present disclosure.

FIG. 8 illustrates an example of the evolution of clock values at multiple nodes, according to an embodiment of the present disclosure. Values for r and s are set equal to one. Each of four nodes begins with a clock vector initialized to [0 0 0 0]. Immediately prior to a message being sent, the sending node will increment its local clock component by one. Messages including vector timestamps are denoted using solid lines, and messages including scalar timestamps are denoted using dashed lines. Events (including message sends and receives) are shown as solid filled circles. Vector clock values and vector timestamps are shown as sets of four numbers.

Selected aspects of FIG. 8 are now referred to. Other aspects can be interpreted similarly. At 805, node 2 determines to send a message including a vector timestamp to node 1. Node 2 therefore increments its own local clock component $CK_2[2]$ according to Equation (1) from 0 to 1 and sends message 806 including vector timestamp [0 1 0 0] equal to Node 2's VS clock vector 807 as shown. Node 1, upon receipt of the message 806, updates its VS clock vector from [0 0 0 0] to [2 1 0 0] 808 by implementing Equations (3) and (4). For Equation (4), $CK_1[1]$ is updated via max(max([0 1 0 0], 0)+1=2. For Equation (3), $CK_1[2]$ is updated via max(1,0)=1; $CK_1[3]$ is updated via max(0,0)=0; and $CK_1[4]$ is updated via max(0,0)=0. At 810, node 2 experiences a local event without a related message and increments its own local clock component $CK_2[2]$ again according to Equation (1). At 815, node 1 determines to send a message including a scalar timestamp to node 3. Node 1 therefore increments its own local clock component $CK_1[1]$ according to Equation (1) from 2 to 3 to arrive at VS clock value 816 and sends message 817 including scalar timestamp $TS^S(m)=CK_1[1]=3$ 818 as shown. Node 3, upon receipt of the message 816, updates its clock vector from [0 0 2 0] to [0 0 4 0] by implementing Equation (2). For Equation (2), $CK_3[3]$ is updated via max(3, 2)+1=4. Equation (3), if pending, is not applied because there are no non-local clock components in the scalar timestamp. Equation (4), if implemented instead of Equation (2), would cause the equivalent update to $CK_3[3]$ via max(max([0 0 3 0], 2)+1=4 (the '3' being considered for formal processing to be the third component of the timestamp vector, and the other components of the timestamp vector being set to zero for processing purposes, since not defined).

Figure 9:
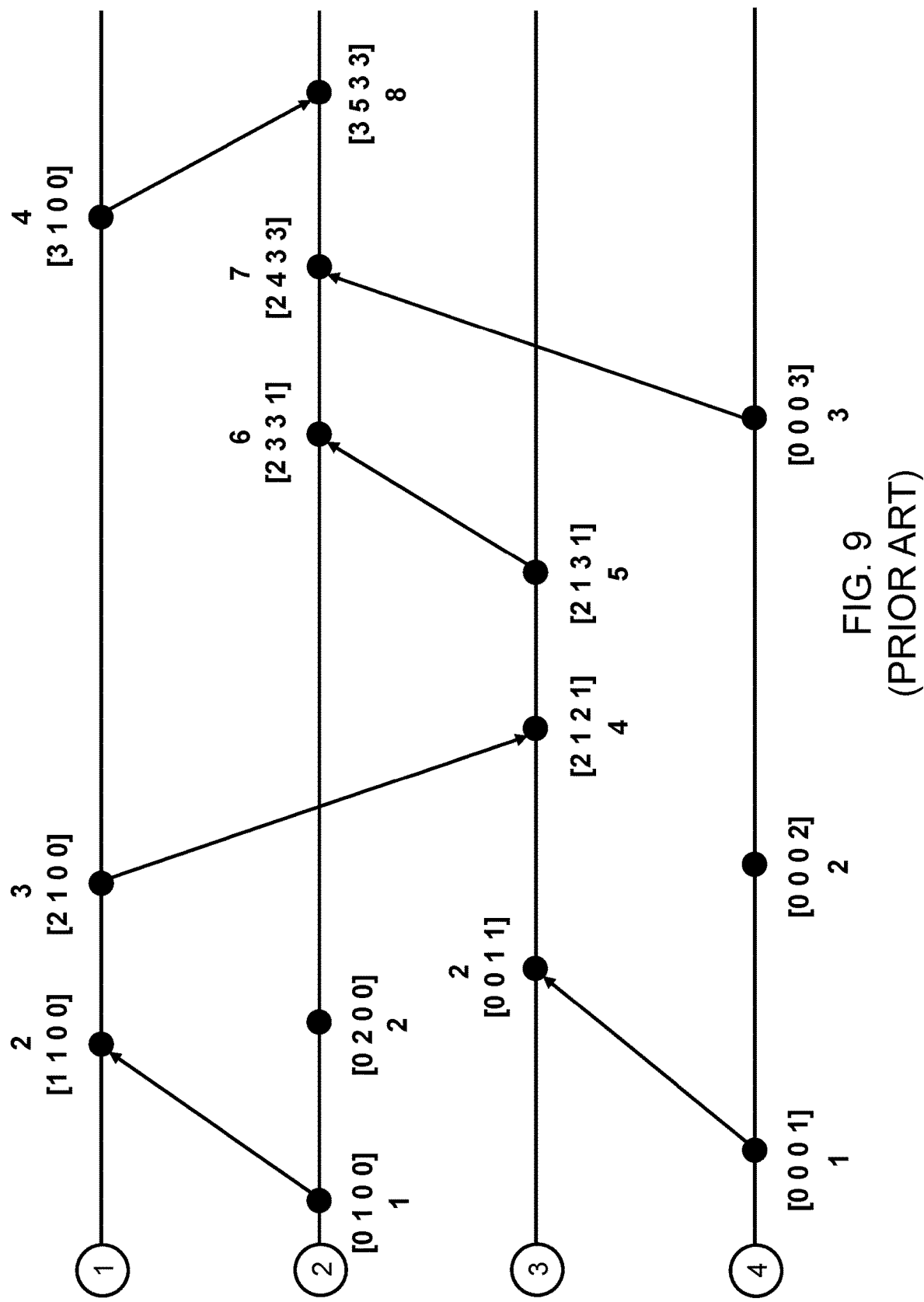
FIG. 9 illustrates an example of nodes sending messages and updating Lamport or vector clocks, for comparison with the embodiment of FIG. 8.
Figure 10:
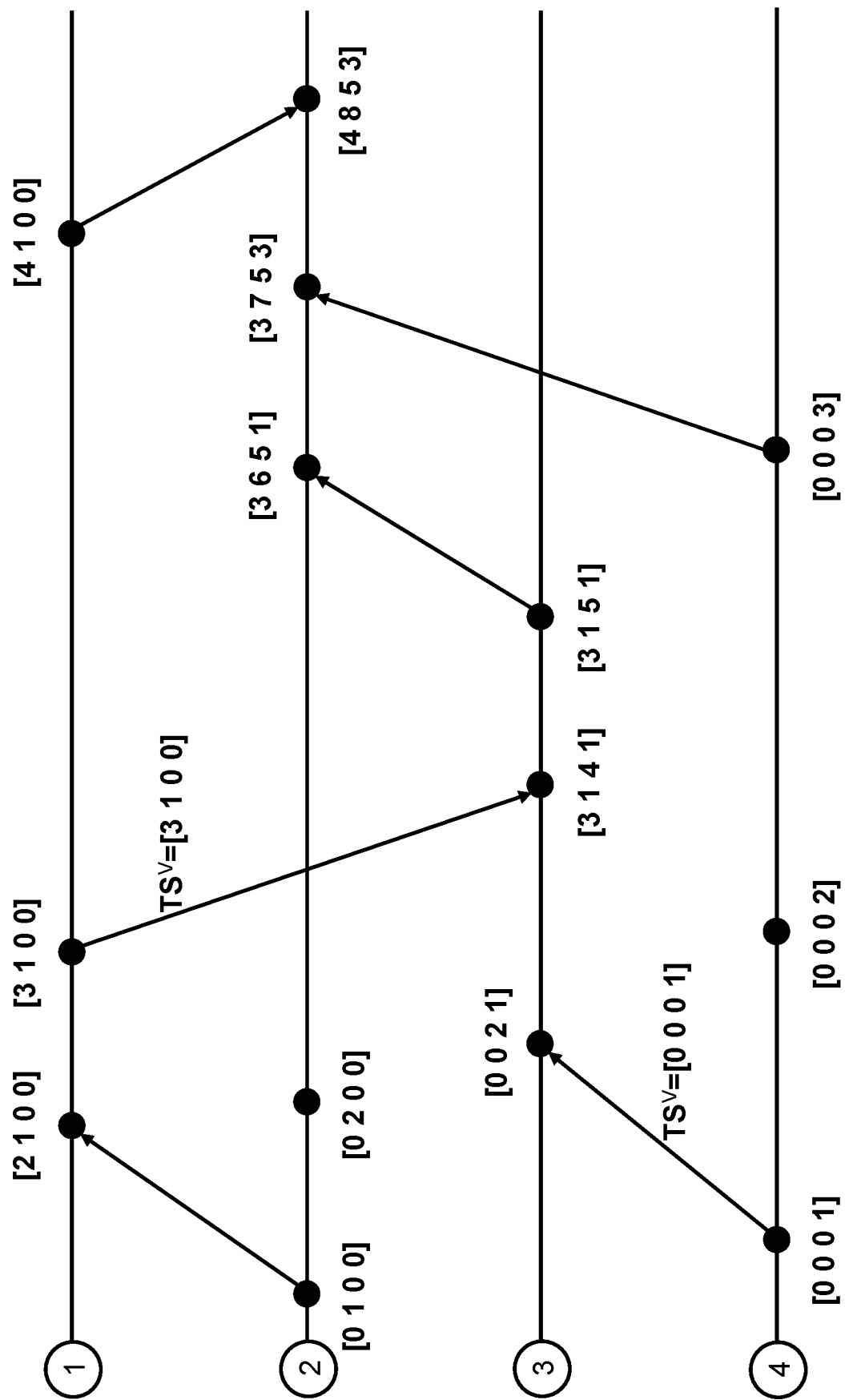
FIG. 10 illustrates another example of nodes sending messages and updating VS clocks, according to an embodiment of the present disclosure.

FIG. 9 illustrates, for comparison, the same message passing scenario as FIG. 8, except that values for Lamport clocks and vector clocks are shown. The Lamport clock value at each event is shown as a single number, and the vector clock value is shown as a vector of four numbers. It is noted that the local component of the VS clocks in FIG. 8 match with their corresponding Lamport clock values in FIG. 9. The VS clock values in FIG. 8 are not necessarily greater than their corresponding vector clock values in FIG. 9 due to the presence of scalar timestamps. However, if all timestamps were vector timestamps, each VS clock value would be equal to or greater than its corresponding vector clock value. FIG. 10 illustrates such an example scenario. In particular, FIG. 10 corresponds to FIG. 8 except that all timestamps are vector timestamps in FIG. 10. Comparing FIGS. 9 and 10, it is evident that all VS clock values in FIG. 10 are greater than or equal to their corresponding vector clock values in FIG. 9, on a per-component basis.

As the VS clocks as described herein exhibit all the conventionally required properties of both Lamport and vector clocks, systems implementing VS clocks can be considered compatible with, and exhibit the benefits and properties of, both clock types. The benefits and properties of vector clocks can be temporarily lost, at least for some parts of a network, when scalar timestamps are used. However, such benefits and properties can later be restored. Such restoration may be performed, for example, by causing all nodes of a system exchange vector clocks with one another.

Systems of nodes implementing logical clocks conforming with Lamport clock requirements can establish a partial ordering of events between different nodes (also referred to as processes). In particular, if an event a happens before an event b in physical time, then, at any node, then either the logical time of event a will be less than the logical time of event b, or the logical times of the two events are not comparable, if the nodes observing the events do not exchange messages. It is noted that a system of nodes implementing VS clocks will conform with such requirements regardless of the combination of vector and scalar timestamps used. Other properties of Lamport clocks can be similarly established and employed. Logical time can be defined using a per-node function $Time_j(e)$, where e is an event and j is the node. The logical time function may be required to satisfy a condition that, if e1 and e2 are on the same node and e1 precedes e2, then $Time_j(e1)<Time_j(e2)$. Preceding may refer to physical time, which is time as being objectively measured by some physical clock device. Furthermore, if e1 is the event of sending a message by node j and e2 is the event of receiving the message on node i, then $Time_j(e1)<Time_i(e2)$.

In various embodiments, when event ordering is required but causality is already known (e.g. by using concurrency control), only the ID of a node that introduced the event as well as a scalar timestamp are attached to a message. When causality is known from context, or is not important, event ordering is referred to as simple event ordering. Simple event ordering may thus correspond to ordering of events using timestamps, when it is known by other means that events are causally dependent. Examples of such cases include: generation of a log record that reflects a change on page, applying a log record with a change to a page, saving log record or a new version of a page. These types of events are frequent in a database and may happen at the rate of millions per second per node. In such cases, message overhead for logical timekeeping is low as only one counter is passed instead of a full vector timestamp. Note that an event is considered to be atomic, and atomicity is guaranteed by concurrency control. Concurrency control can be either optimistic, pessimistic or other.

In various embodiments, full vector timestamps may be used to create a global snapshot of a system. For example, a physical snapshot of a database may be created in order to scan a database table for a record. As another example, a physical snapshot of a database may be created when a consistency point is required to prevent stale database reads. These types of actions are less frequent than those requiring scalar timestamps, and may happen at the rate of thousands per second, for example. When such actions are required, full vector timestamps are exchanged.

Embodiments of the present disclosure may be implemented in a distributed system that uses distributed algorithms, in which nodes modify a shared state, and/or in which nodes send messages and require change ordering or periodic global consistent snapshots. Systems with high amounts of changes may particularly benefit. Examples include distributed, database, systems for high-performance computing, key-value stores. Previously described FIG. 3 gives an example of a multi-master database in which embodiments may be implemented.

In various embodiments, VS clock with scalar timestamps can be used when ordering (i.e. arranging in order) changes (e.g. log records) to a database page, for example as described in U.S. Pat. No. 10,725,983, the contents of which are incorporated herein by reference. Creation or saving of a page is considered herein equivalent to sending a message. The index of the node (e.g. database master) which is the last node to modify the page, along with a VS clock scalar timestamp from that node at the last modification, is saved with the page. Before a page can be modified, the page needs to be read into memory from a persistent storage or persistent memory. This reading is considered equivalent to receiving a message (i.e. the message considered sent when creating or saving the page). The VS clock's (node's) local clock component at the time that the page is modified is larger than the timestamp value of the last page modification, because modification of the previously timestamped page requires receiving the page in a message, which increments local clock component according to Equation (2). Thus the Lamport clock requirement is satisfied and ordering of dependent changes is preserved. A similar approach of transferring only local clock component values is applicable to page or log record read, write, lock, or unlock operations. These types of messages are considered to be frequently exchanged and small in size in most applications. Therefore, inclusion of a scalar timestamp rather than a vector timestamp is considered to be significantly impactful, due to a significantly reduced timestamp overhead relative to message size.

In some embodiments, VS clocks with vector timestamps can be used to create a globally consistent snapshot of a physical database state (or state of another distributed system storing data). Because a database state typically involves multiple items, it cannot be modified atomically. Furthermore, changes to the set of database pages can be made simultaneously or concurrently by different hosts. A globally consistent snapshot is often required in order to obtain useful information from the database. Physically consistent reads (e.g. b-tree traversal) may be done by reading versions of database pages as if they were (or could be) at some point in time. Each host is typically reading changes from others (including dependencies). Reading may be done by sending messages (log records) directly or via memory writes and reads. According to embodiments, message sent is accompanied with a VS clock vector timestamp. Such messages may contain all changes to multiple pages done on a sender and accumulated over a length of time. Such messages are typically not very frequent (e.g. hundreds per second) and relatively large (e.g. many kilobytes). Thus the relative overhead due to including vector timestamps in such messages is expected to be small. Because VS clocks are compatible with vector clocks, i.e. all assumptions or requirements of vector clocks are satisfied, globally consistent snapshots of a system can be created using the same approaches as those employed for vector clocks, such approaches being already established in the state of the art.

In view of the above, embodiments of the present disclosure provide for methods, system and apparatus in which nodes use VS clocks to order log records, log flush buffers, or both, using VS clocks, for example in a multi-master database. This can involve the actions of: producing log records and log flush buffer (LFB), ordering log records in a page store, and ordering log flush buffers on other nodes or masters.

The producing log records and LFB may proceed as described below. A database state change can be represented as a sequence of atomic changes to database pages that contain user data. Each such change constitutes an event. In addition to modifying a page, a log record of the change is produced. The log record describes the change. Each event is timestamped with the current value of a VS clock and the local component of the VS clock is incremented atomically with the creation of the timestamp. The scalar component of the timestamp and the current node (database master) ID are recorded (timestamped) in the page itself and in the log record. In addition, the log record contains the timestamp and the node ID of the page before the modification. Log records are joined into a LFB for the purpose of sending it to storage and other nodes (database masters). (This approach may be taken as it may be more efficient than sending each individual node the log records.) Each LFB is timestamped with the full VS clock timestamp of the last log record. The timestamp of the previous LFB produced by the same master is also recorded.

In order to be modified, a page need to be loaded by a master (i.e. a node). Reading a page is deemed as equivalent to receiving a message from the last master that has modified the page. All events of the master that reads the page, that happened after reading the page, have to be considered to happen after the last modification of the page. A master can obtain this page in full from a page store or by obtaining an older version of the page and then applying the recent log records to this older version of the page cached in the master's memory. When the master reads a full page or all log records, it obtains the page or log record timestamp and updates its local VS clock component to the maximum of the record's scalar timestamp and the current value of the local clock component. Thus log records of page are timestamped in the increasing order.

Ordering (i.e. putting in order) of log records in the page store may be described as follows. Log records are applied to the pages in the page stores on a continuous basis, so that page stores can produce new versions of pages. Log records need to be applied in the same order as they have been produced, as each log record contains incremental changes. Because log records are timestamped with the VS clock scalar timestamp, and also contain a VS clock scalar timestamp of the previous change, page stores can order log records in the order of their timestamps, and detect missing log records. Once all log records are received without gaps up to a certain timestamp by a page store, they can be applied by this page store in the order of the VS timestamps.

Ordering log flush buffers on other masters may be described as follows. Masters contain cached version of some (usually recently or frequently used) subset of database pages in their memory for quick access that bypasses the page stores. The collection of such pages is called buffer pool (BP). Masters keep their buffer pool up to date by reading other master LFBs.

BP pages should be consistent, which means that if a page in a BP is updated to a certain timestamp, all other pages that were updated before and happen to be in the BP, need to be also updated up to this timestamp or to a later version. Otherwise, the pages in the BP may be inconsistent with each other.

As an example, suppose a first Master M1 modifies the page P1. E.g., P1 contains an amount of money in some customer account, and M1 updates account record bringing money amount from zero to some other number. A second Master M2 reads this page's latest change from an LFB from master M1 and, based on the values stored in P1, modifies values on another page P2. Values on page P2 and P1 should be consistent. E.g. if P2 contains a financial transaction record that transfers some money from the above account, it is expected that the balance on page P1 is larger than then value transferred on P2. A third Master M3 has both pages P1 and P2 in its BP as they were before the above changes. If M3, reads LFB from M2 before reading LFB from M1, then it will have in its BP data that has an old balance of zero and a transaction record that transfers some positive amount from the same account. This is inconsistent. Thus log records from LFB from M2 can be only applied only after log records of LFB from M1 are applied.

Figure 11:
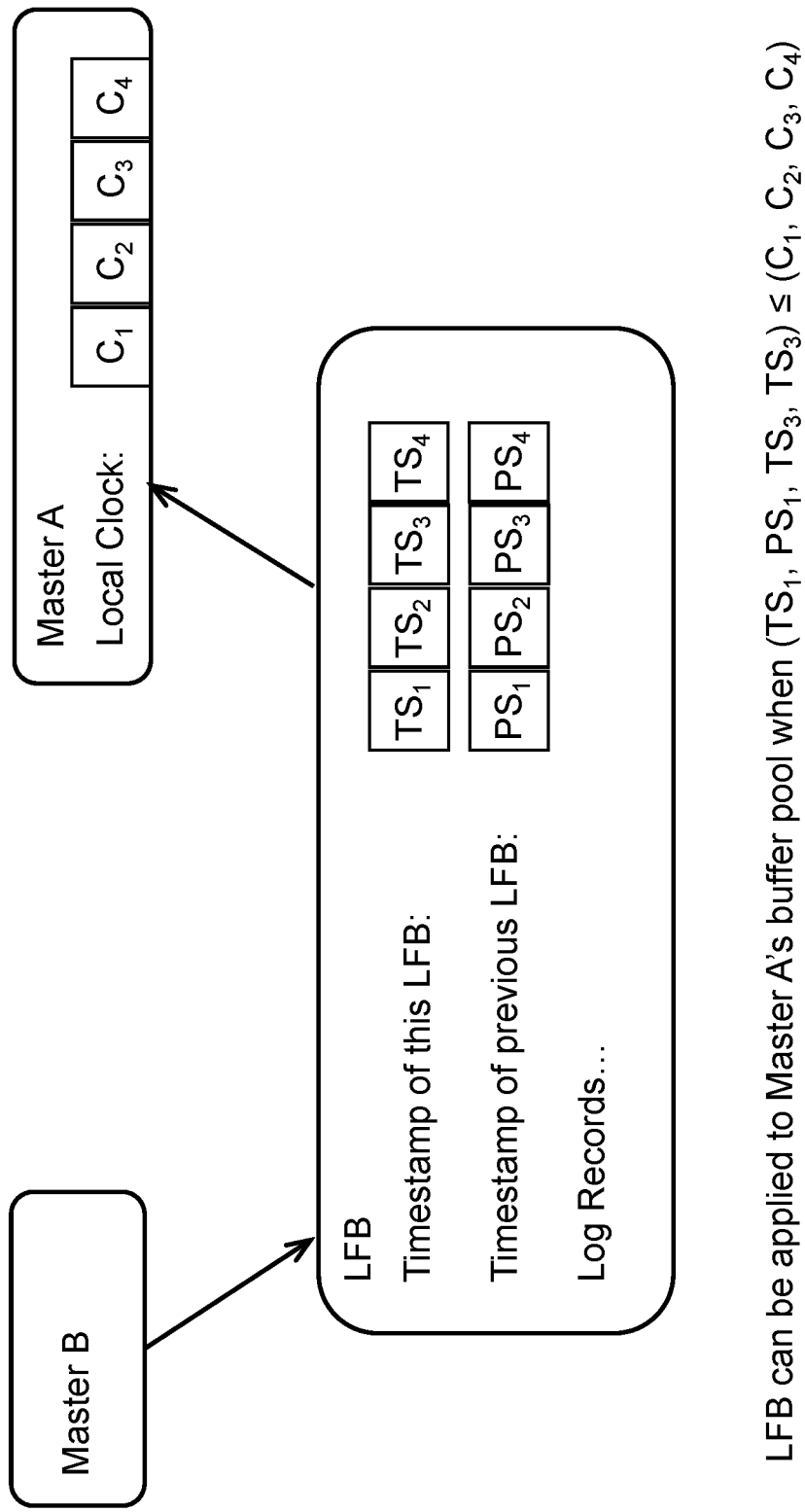
FIG. 11 illustrates an example of criteria used to check if a log flush buffer (LFB) from one node of a multi-master database can be applied immediately on another node of a multi-master database, according to an embodiment.

To be causally consistent, a first database master, Master A, reading an LFB from a second database master, Master B's log must be aware of all changes that Master B was aware of when writing this LFB. Consequently, all components of Master A's clock vector, except the one that corresponds to Master B, must be no less than the corresponding component of the timestamp. Master A's clock component that corresponds to Master B should be equal to the Master B component from the timestamp of the Master's B previous LFB, which means that the previous LFB from Master B has been processed. FIG. 11 illustrates an example of the criteria used to check if an LFB from Master B can be applied immediately on Master A or if application needs to wait for other LFBs. When the LFB is processed the local clock of the processing master is advanced using Equations (3) and (4).

Another example, beginning with the scenario of the previous example, is as follows. Initial clock values of each master are assumed to be (0,0,0). When M1 modifies P1, its VS clock value (sent with LFB) will be (1,0,0). When M2 receives P1, M2 updates its clock to (1,1,0). When M2 modifies P2, M2's clock value becomes (1,2,0). M2 timestamps the LFB with this value. When M3 reads this LFB, M3 checks the LFB timestamp (1,2,0) against its local timestamp (0,0,0), finds its to be smaller and puts this LFB on hold. Then M3 reads the LFB from M1. M3 checks the LFB timestamp (1,0,0) against its local timestamp (except the component that corresponds to M1) and finds that it is equal to its local VS clock and thus this LFB can be applied. M3 applies the LFB, bringing P1 to the latest version, and updates its clock to (1,0,1). Now, M3 compares its VS clock with the timestamp of the LFB that have been received from M2 and, this time, finds that that the clock has reached the time stamp. M3 applies the LFB, bringing P2 to the latest version, and updates the clock to (1,2,2).

In some embodiments, LFB does not need to be explicitly timestamped with the local VS clock value at the time point when it is sent to other master and storage. Instead, it can be created by using the maximum values of the previous timestamps of a page being modified across all log records in the LFB grouped by master id (i.e. per vector component). If the LFB does not contain a component that corresponds to a certain master, it can be concluded that the LFB in question does not have log records that directly depend on the changes from that master and this component can be marked with a special value and ignored upon attempt to apply this LFB. This reconstructed timestamp of LFB still is equal to or greater than the timestamp of any page that any log record in this LFB modifies. So, upon reading and applying this LFB, in order to be consistent, it is enough for the overall clock value to reach it. This embodiment allows the LFB to be applied sooner than in the above-described example.

Embodiments of the present disclosure, implemented in a multi-master database, provide for obtaining dependent changes when reading the latest version of a page. Some such embodiments are described as follows. If a master requires a guarantee that it has the latest version of a page, the common practice is to lock this page using a lock manager. A lock manager is a component that can grant an exclusive or shared locks to other components, e.g. database masters. When a page is being modified, the master that modifies it obtains an exclusive lock. It is assumed that no other master can have any type of locks on a page when some master has an exclusive lock. Thus, having a lock on a page guarantees that the page is the latest version. In this embodiment, the lock manager is also made aware of the VS clock timestamps. When a master is to update a page, it requests an exclusive lock on it. After the page modification, the master unlocks the page, and returns the page's scalar VS clock timestamp (the same that is recorded on the page and the corresponding log record as described previously) to the lock manager. The lock manager keeps the timestamp value for the page. Eventually, once the master ensures that all other components, e.g. storage and other masters, have received this change (based on timestamps received from them back), the master informs the lock manager of this. If there are no further exclusive lock requests to this page, the lock manager can discard the page's timestamp.

When a host is to read the latest version of a page, the host issues a lock request for this page. The lock manager grants the lock and sends to the master the timestamp of this page if it has one. If the master receives the timestamp for the page, the master waits for its local VS clock component to reach or bypass the page's timestamp as it was received from the lock manager. This ensures that all dependent changes have been processed by the master. If the lock manger does not send a timestamp, it might be concluded that the lock manager received a command to discard it, which in turn implies that that the current master and the storage has already have its clock value bypassing the page's timestamp.

After that, the master can read the page contents from the storage or its own buffer pool.

Embodiments of the present disclosure, implemented in a multi-master database, provide for creation of consistent multi-version concurrency control (MVCC) snapshots. MVCC snapshots are used to create a version of a database (or portion thereof) as it was in certain point in time. These are globally consistent snapshots as per the following definition. A globally consistent system snapshot is a snapshot of states of all nodes in a system, as well as messages being in the communication channels, with the property that if an event e is recorded in the snapshot, then all events e1, for which Time(e1)<Time(e) (the function Time( ) measuring physical time) are also recorded in the snapshot.

In order to create an MVCC snapshot on a master, it is enough to record the current value of the master's VS clock vector and define it as a timestamp of the MVCC snapshot. When reading a page for this snapshot, it is required to read the maximum version (ordered by scalar timestamp value) of the page that has timestamp smaller than the component of the snapshot timestamp that corresponds to the master ID of that version.

The above embodiments facilitate consistency of a database only if all messages exchanged by masters directly or indirectly contain VS clock timestamps. This is not necessarily the case when a third party application communicates with more than one master. E.g. if master M1 sends a message to a user application and the user application sends another message based on the first one to master M2, it implies that master M1 indirectly sent a message to master M2. Because the user application may not implement VS clocks, M2 may not be able to update its clocks accordingly and an inconsistency can be observed. Since a user application is generally unaware of the database physical structure, this inconsistency also cannot be physical, i.e. violate database internal data. However, this inconsistency can be logical, i.e. violate the consistency of the user data.

As an example, a user through an application can access master M1 to add money to an associated bank account. Afterwards, the same user can use the application to check the account. This time the application executes the balance query on another master M2. M2 has a corresponding page in its BP, and the LFB that has the balance change has not yet been processed by M2. In this case, M2 will return the old account balance without the recent money deposit, and user will see an inconsistency.

In order to address the above problem, consistency sensitive queries can be marked as such. Upon reception of such a query, the master that executes such query (executing master) will send all other masters a request for their current VS clock timestamps. Upon reception of the response, the executing master will create a VS timestamp that includes a per-component maximum of all timestamps received. Afterwards, the executing master will delay the query execution until its VS clock value becomes larger than the created timestamp. Afterwards, the query can be executed. Because the request of other master clock values happen after the query reception, the value of each received timestamp is guaranteed to be higher than any change done by the master that has sent this timestamp after the query is received. Choosing the per-component maximum results in all changes done by all masters before reception of the query and their dependencies having timestamps smaller than the created timestamp. Thus, when the overall clock of the executing master reaches or surpasses the created timestamp, the executing master will have all changes from the other masters that happened before the reception of the query. Thus, embodiments may provide for globally consistent transactions.

Figure 12:
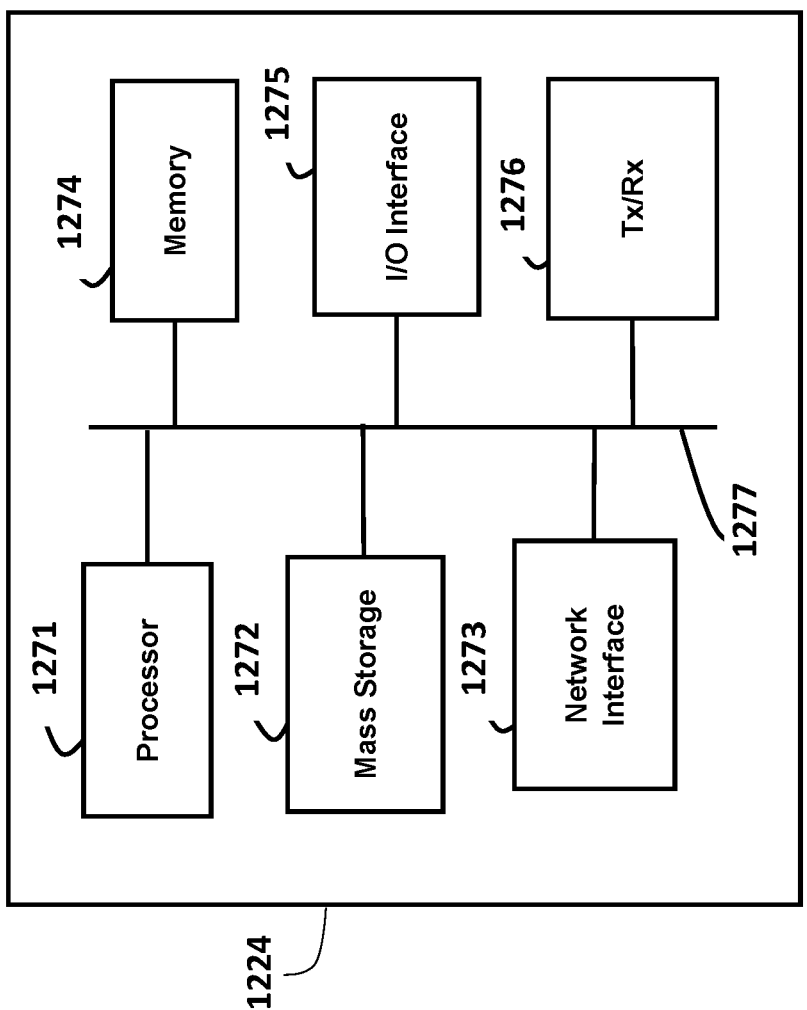
FIG. 12 illustrates an electronic device according to an embodiment of the present disclosure.

FIG. 12 is a block diagram of an electronic device 1224 which was denoted in the present disclosure as a networked device, apparatus or node. The device may be a device in a multi-master database or other system. The device may comprise a computer processor operatively coupled to a computer memory. A computer equipped with network function may be configured as an electronic device. The device may correspond to parts of a computer server, for example in a datacenter, or a network node providing network access (e.g., a gNB).

As shown in FIG. 12, the device 1224 includes a processor 1271, such as a Central Processing Unit (CPU) or specialized processors such as a Graphics Processing Unit (GPU) or other such processor unit, memory 1274, non-transitory mass storage 1272, I/O interface 1275, network interface 1273, and a transceiver 1276, all of which are communicatively coupled via bi-directional bus 1277. According to certain embodiments, any or all of the depicted elements may be utilized, or only a subset of the elements. Further, the device 1224 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 1274 may include any type of non-transitory memory such as static random access memory (SRAM), dynamic random access memory (DRAM), synchronous DRAM (SDRAM), read-only memory (ROM), any combination of such, or the like. The mass storage element 1272 may include any type of non-transitory storage device, such as a solid state drive, hard disk drive, a magnetic disk drive, an optical disk drive, USB drive, or any computer program product configured to store data and machine executable program code. According to certain embodiments, the memory 1274 or mass storage 1272 may have recorded thereon statements and instructions executable by the processor 1271 for performing any of the aforementioned method operations described above.

It is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology. Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device. Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An apparatus implementing a logical clock, the apparatus configured to:
update the logical clock upon receipt of a message from another apparatus implementing another instance of the logical clock, the logical clock having multiple clock components including a local clock component representing a logical local time of the apparatus,
wherein:
when the message includes a vector time stamp having multiple values, said updating conforms with both: a Lamport clock requirement with respect to the local clock component; and a vector clock requirement with respect to all of the multiple clock components; and
when the message includes a scalar timestamp having a single value, said updating conforms with the Lamport clock requirement with respect to the local clock component, without necessarily conforming with said vector clock requirement.

2. The apparatus of claim 1, wherein, with the vector timestamp being denoted as a vector $TS^V(m)$ having each $k^{th}$ component $TS^V(m)[k]$, the scalar timestamp being denoted as $TS^S(m)$, and the logical clock $CK_j$ being denoted as a vector having each $k^{th}$ component $CK_j[k]$, with component $CK_j[j]$ representing the local clock component, conforming with the Lamport clock requirement comprises updating the logical clock according to an update rule satisfying:

$$CK_j[j] \leftarrow \max\left(\max_k(TS^V(m)[k]), CK_j[j]\right) + r, r > 0,$$

when a vector timestamp is received, and $$CK_j[j] \leftarrow \max(TS^S(m), CK_j[j]) + r, r > 0,$$

when a scalar timestamp is received.

3. The apparatus of claim 1, wherein, with the vector timestamp being denoted as a vector $TS^V(m)$ having each $k^{th}$ component $TS^V(m)[k]$, the scalar timestamp being denoted as $TS^S(m)$, and the logical clock $CK_j$ being denoted as a vector having each $k^{th}$ component $CK_j[k]$, with component $CK_j[j]$ representing the local clock component, conforming with the vector clock requirement comprises updating the logical clock according to an update rule satisfying:

$$CK_j[k] \leftarrow \max(TS^V(m)[k], CK_j[k]), \forall k \neq j.$$

4. The apparatus of claim 1, wherein, with the vector timestamp being denoted as a vector $TS^V(m)$ having each $k^{th}$ component $TS^V(m)[k]$, the scalar timestamp being denoted as $TS^S(m)$, and the logical clock $CK_j$ being denoted as a vector having each $k^{th}$ component $CK_j[k]$, with component $CK_j[j]$ representing the local clock component, conforming with both the Lamport clock requirement and the vector clock requirement comprises updating the logical clock according to an update rule satisfying:

$$CK_j[k] \leftarrow \max(TS^V(m)[k], CK_j[k]), \forall k \neq j;$$

$$CK_j[j] \leftarrow \max\left(\max_k(TS^V(m)[k]), CK_j[j]\right) + r, r > 0,$$

when a vector timestamp is received, and $$CK_j[j] \leftarrow \max(TS^S(m), CK_j[j]) + r, r > 0,$$

when a scalar timestamp is received.

5. The apparatus of claim 1, wherein the updating conforming with both the Lamport clock requirement and the vector clock requirement comprises:
updating the local clock component in conformity with the Lamport clock requirement, based on the vector timestamp and a current state of the logical clock; and
updating all of the multiple clock components, other than the local clock component, in conformity with the vector clock requirement, based on the vector timestamp and the current state of the logical clock.

6. The apparatus of claim 5, wherein updating each one of the multiple clock components other than the local clock component comprises either:
adjusting said one of the multiple clock components upward according to an update rule; or
maintaining said one of the multiple clock components at its prior value without adjustment, when said maintaining satisfies the update rule.

7. The apparatus of claim 1, wherein the updating conforming with the Lamport clock requirement without necessarily conforming with said vector clock requirement comprises:
updating the local clock component in conformity with the Lamport clock requirement, based on the vector timestamp and a current state of the logical clock; and
refraining from updating all of the multiple clock components other than the local clock component.

8. The apparatus of claim 1, further configured to: process at least part of the message to determine whether the message includes the vector timestamp or the scalar timestamp.

9. The apparatus according to claim 1, wherein the apparatus is one of a plurality of master devices in a multi-master database.

10. The apparatus according to claim 9, wherein each of the master devices is configured to send an associated message including a scalar timestamp when the associated message relates to a simple event ordering required at a recipient, and is configured to send another associated message including a vector timestamp when the other associated message relates to a globally consistent state required at the recipient, or when determining causality from timestamps is required, or a combination thereof.

11. The apparatus according to claim 1, wherein when the message includes the scalar timestamp, the message also relates to a simple event ordering, when causality of events is known or unimportant, at the apparatus, and when the message includes the vector timestamp, the message also relates to a globally consistent state at the apparatus.

12. The apparatus according to claim 1, further configured, when the apparatus is to send another message to another apparatus implementing another logical clock, to:
select either another scalar timestamp or another vector timestamp to include in the other message; and
send the other message including the other scalar timestamp or the other vector timestamp, wherein the other scalar timestamp is set to a value of the local clock component following an incrementing thereof; and
wherein the other vector timestamp is set to a vector value having multiple components, one of the multiple components, having an index corresponding to an index of the apparatus, being set to a value of the local clock component following an incrementing thereof, and each other one of the multiple components being set to respective values equal to a different respective one of the multiple clock components other than the local clock component, with all of the multiple clock components being represented in the other vector timestamp.

13. An apparatus implementing a logical clock, the apparatus in a network and configured to:
maintain the logical clock having multiple clock components including a local clock component representing a logical local time of the apparatus;
when the apparatus is to send a first message to another apparatus implementing another logical clock, to:
send the first message including a scalar timestamp set equal to a value of the local clock component when the first message is being sent, or when data in the first message was created, following an incrementing thereof; and
when the apparatus is to send a second message to the other apparatus or to a further apparatus implementing a further logical clock, the second message sent either prior to or following the first message, to:
send the second message including a vector timestamp, wherein the vector timestamp is set equal to a vector value having multiple components, one of the multiple components, having an index corresponding to an index of the apparatus, being set equal to a value of the local clock component when the second message is being sent, following an incrementing thereof, and each other one of the multiple components being set to respective values equal to a different respective one of the multiple clock components other than the local clock component when the second message is being sent, with all of the multiple clock components being represented in the vector timestamp.

14. The apparatus of claim 13, wherein the first message further relates to a simple event ordering, when causality of events is known or unimportant, at the other apparatus, and wherein the second message further relates to a globally consistent state at the other apparatus or the further apparatus being the recipient of the second message.

15. A method for implementing a logical clock in a networked apparatus, the method comprising:
- updating the logical clock upon receipt of a message from another apparatus implementing another instance of the logical clock, the logical clock having multiple clock components including a local clock component representing a logical local time of the apparatus, wherein:
- when the message includes a vector time stamp having multiple values, said updating conforms with both: a Lamport clock requirement with respect to the local clock component; and a vector clock requirement with respect to all of the multiple clock components; and
- when the message includes a scalar timestamp having a single value, said updating conforms with the Lamport clock requirement with respect to the local clock component, without necessarily conforming with said vector clock requirement.

16. The method of claim 15, wherein, with the vector timestamp being denoted as a vector $TS^V(m)$ having each $k^{th}$ component $TS^V(m)[k]$, the scalar timestamp being denoted as $TS^S(m)$, and the logical clock $CK_j$ being denoted as a vector having each $k^{th}$ component $CK_j[k]$, with component $CK_j[j]$ representing the local clock component, conforming with the Lamport clock requirement comprises updating the logical clock according to an update rule satisfying:

$$CK_j[j] \leftarrow \max\left(\max_k(TS^V(m)[k]), CK_j[j]\right) + r, r > 0,$$

when a vector timestamp is received, and $$CK_j[j] \leftarrow \max(TS^S(m), CK_j[j]) + r, r > 0,$$

when a scalar timestamp is received.

17. The method of claim 15, wherein, with the vector timestamp being denoted as a vector $TS^V(m)$ having each $k^{th}$ component $TS^V(m)[k]$, the scalar timestamp being denoted as $TS^S(m)$, and the logical clock $CK_j$ being denoted as a vector having each $k^{th}$ component $CK_j[k]$, with component $CK_j[j]$ representing the local clock component, conforming with the vector clock requirement comprises updating the logical clock according to an update rule satisfying:

$$CK_j[k] \leftarrow \max(TS^V(m)[k], CK_j[k]), \forall k \neq j.$$

18. The method of claim 15, wherein, with the vector timestamp being denoted as a vector $TS^V(m)$ having each $k^{th}$ component $TS^V(m)[k]$, the scalar timestamp being denoted as $TS^S(m)$, and the logical clock $CK_j$ being denoted as a vector having each $k^{th}$ component $CK_j[k]$, with component $CK_j[j]$ representing the local clock component, conforming with both the Lamport clock requirement and the vector clock requirement comprises updating the logical clock according to an update rule satisfying:

$$CK_j[k] \leftarrow \max(TS^V(m)[k], CK_j[k]), \forall k \neq j;$$

$$CK_j[j] \leftarrow \max\left(\max_k(TS^V(m)[k]), CK_j[j]\right) + r, r > 0,$$

when a vector timestamp is received, and $$CK_j[j] \leftarrow \max(TS^S(m), CK_j[j]) + r, r > 0,$$

when a scalar timestamp is received.

19. The method according to claim 15, wherein the apparatus is one of a plurality of master devices in a multi-master database, the method further comprising sending an associated message including a scalar timestamp when the associated message relates to a simple event ordering required at a recipient, and sending another associated message including a vector timestamp when the other associated message relates to a globally consistent state required at the recipient, or when determining causality from timestamps is required, or a combination thereof.

20. The method according to claim 15, wherein when the message includes the scalar timestamp, the message also relates to a simple event ordering, when causality of events is known or unimportant, at the apparatus, and when the message includes the vector timestamp, the message also relates to a globally consistent state at the apparatus.

21. A method for implementing a logical clock in an apparatus connected to a network, the method comprising:
- maintaining the logical clock having multiple clock components including a local clock component representing a logical local time of the apparatus;
- when the apparatus is to send a first message to another apparatus implementing another logical clock:
  - sending the first message including a scalar timestamp set equal to a value of the local clock component when the first message is being sent, or when data in the first message was created, following an incrementing thereof; and
- when the apparatus is to send a second message to the other apparatus or to a further apparatus implementing a further logical clock, the second message sent either prior to or following the first message:
  - sending the second message including a vector timestamp, wherein the vector timestamp is set equal to a vector value having multiple components, one of the multiple components, having an index corresponding to an index of the apparatus, being set equal to a value of the local clock component when the second message is being sent, following an incrementing thereof, and each other one of the multiple components being set to respective values equal to a different respective one of the multiple clock components other than the local clock component when the second message is being sent, with all of the multiple clock components being represented in the vector timestamp.

* * * * *

UNITED STATES PATENT AND TRADEMARK OFFICE
CERTIFICATE OF CORRECTION

| | |
|---|---|
| PATENT NO. | : 11,843,663 B1 |
| APPLICATION NO. | : 18/092577 |
| DATED | : December 12, 2023 |
| INVENTOR(S) | : Alexandre Depoutovitch et al. |

It is certified that error appears in the above-identified patent and that said Letters Patent is hereby corrected as shown below:

In the Specification

In the description

Column 10, Line 18, "$CK_j[2],…CK_j[1/1]$], where N is the size of the clock" should read -- $CK_j[2],…CK_j[N]$], where N is the size of the clock --.

Signed and Sealed this
Nineteenth Day of March, 2024

Katherine Kelly Vidal
*Director of the United States Patent and Trademark Office*